(12) United States Patent
Kawaguchi et al.

(10) Patent No.: US 9,593,611 B2
(45) Date of Patent: Mar. 14, 2017

(54) EXHAUST GAS CONTROL APPARATUS FOR INTERNAL COMBUSTION ENGINE

(71) Applicants: Bungo Kawaguchi, Susono (JP);
Takeru Shirasawa, Susono (JP);
Tomihisa Oda, Numazu (JP)

(72) Inventors: Bungo Kawaguchi, Susono (JP);
Takeru Shirasawa, Susono (JP);
Tomihisa Oda, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 119 days.

(21) Appl. No.: 14/440,163

(22) PCT Filed: Oct. 28, 2013

(86) PCT No.: PCT/JP2013/079137
§ 371 (c)(1),
(2) Date: May 1, 2015

(87) PCT Pub. No.: WO2014/073408
PCT Pub. Date: May 15, 2014

(65) Prior Publication Data
US 2015/0314239 A1 Nov. 5, 2015

(30) Foreign Application Priority Data
Nov. 7, 2012 (JP) .................. 2012-245210

(51) Int. Cl.
*B01D 50/00* (2006.01)
*F01N 3/10* (2006.01)
(Continued)

(52) U.S. Cl.
CPC ......... *F01N 3/106* (2013.01); *B01D 53/9409* (2013.01); *B01D 53/9431* (2013.01);
(Continued)

(58) Field of Classification Search
CPC ..... F01N 3/20; F01N 3/08; F01N 3/02; F01N 3/208; F01N 2560/026; F01N 2560/021
(Continued)

(56) References Cited

U.S. PATENT DOCUMENTS

2003/0115858 A1* 6/2003 Hahn ................. B01D 53/0454
60/295
2007/0243115 A1 10/2007 Tsumagari et al.
(Continued)

FOREIGN PATENT DOCUMENTS

DE 102011013183 A1 9/2012
JP 2000-161732 6/2000
(Continued)

*Primary Examiner* — Tom P Duong
(74) *Attorney, Agent, or Firm* — Finnegan, Henderson, Farabow, Garrett & Dunner, LLP

(57) ABSTRACT

It is possible to decrease the amount of NOx emitted into the air. The amount of ammonia adsorbed on an SCR catalyst is calculated by subtracting the amount of ammonium nitrate produced on the SCR catalyst from the amount of ammonia adsorbed on the SCR catalyst at the time of starting of an internal combustion engine, and the amount of $NO_2$ flowing into the SCR catalyst is decreased when an NOx purification rate estimated from the amount of ammonia adsorbed on the SCR catalyst is less than a threshold value compared to when the NOx purification rate is equal to or greater than the threshold value.

7 Claims, 14 Drawing Sheets

(51) Int. Cl.
*B01D 53/94* (2006.01)
*F01N 3/02* (2006.01)
*F01N 3/20* (2006.01)
*F01N 3/08* (2006.01)
*F01N 9/00* (2006.01)
*F01N 3/035* (2006.01)

(52) U.S. Cl.
CPC ..... *B01D 53/9477* (2013.01); *B01D 53/9495* (2013.01); *F01N 3/0205* (2013.01); *F01N 3/0814* (2013.01); *F01N 3/103* (2013.01); *F01N 3/206* (2013.01); *F01N 3/2006* (2013.01); *F01N 3/208* (2013.01); *F01N 9/005* (2013.01); *B01D 2251/2062* (2013.01); *B01D 2251/2067* (2013.01); *F01N 3/035* (2013.01); *F01N 2240/16* (2013.01); *F01N 2430/06* (2013.01); *F01N 2550/22* (2013.01); *F01N 2560/026* (2013.01); *F01N 2560/06* (2013.01); *F01N 2560/14* (2013.01); *F01N 2570/14* (2013.01); *F01N 2570/18* (2013.01); *F01N 2610/02* (2013.01); *F01N 2610/03* (2013.01); *F01N 2900/1402* (2013.01); *F01N 2900/1404* (2013.01); *F01N 2900/1602* (2013.01); *F01N 2900/1621* (2013.01); *F01N 2900/1622* (2013.01); *Y02T 10/24* (2013.01); *Y02T 10/26* (2013.01); *Y02T 10/47* (2013.01)

(58) Field of Classification Search
USPC ........... 422/168, 169, 177; 423/210; 60/274, 60/285, 299
See application file for complete search history.

(56) References Cited

U.S. PATENT DOCUMENTS

| | | | |
|---|---|---|---|
| 2009/0056315 A1* | 3/2009 | Solbrig | F01N 3/208 60/286 |
| 2010/0122520 A1* | 5/2010 | Han | F01N 3/208 60/274 |
| 2011/0262329 A1* | 10/2011 | Ofoli | B01D 53/90 423/213.2 |
| 2012/0159934 A1* | 6/2012 | Itoh | F02M 25/0718 60/279 |
| 2012/0214663 A1* | 8/2012 | Chigapov | B01J 37/0203 502/73 |

FOREIGN PATENT DOCUMENTS

| | | |
|---|---|---|
| JP | 2004-346794 | 12/2004 |
| JP | 2005-256727 A | 9/2005 |
| JP | 2006-57577 | 3/2006 |
| JP | 2006-320854 | 11/2006 |
| JP | 2010-101237 | 5/2010 |
| JP | 2011-102573 | 5/2011 |
| JP | 2012-31787 | 2/2012 |

* cited by examiner

F I G . 11
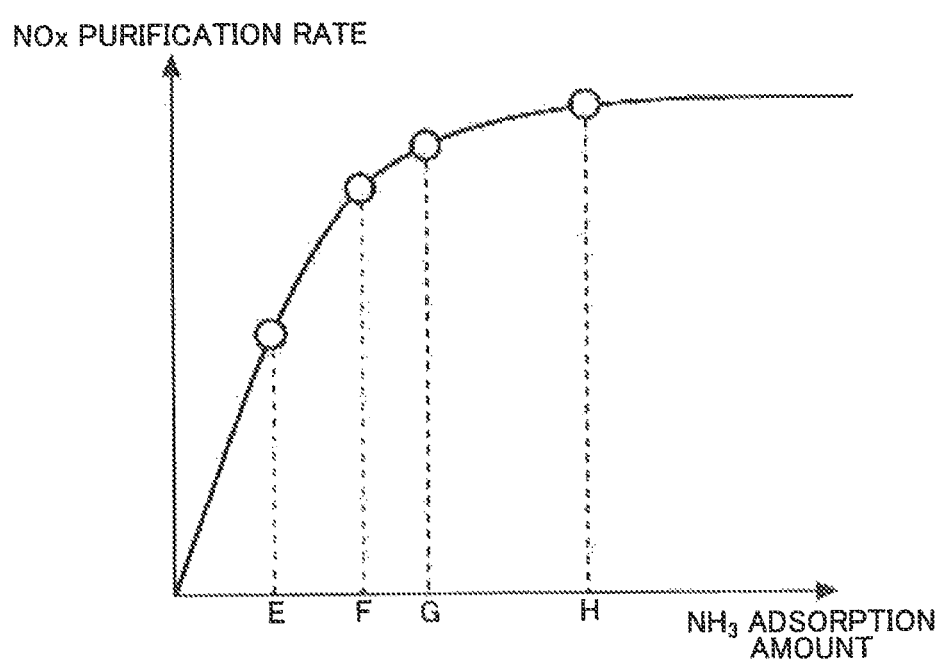

EXHAUST GAS CONTROL APPARATUS FOR INTERNAL COMBUSTION ENGINE

CROSS-REFERENCE TO RELATED APPLICATIONS

This application is a national phase application of International Application No. PCT/JP2013/079137, filed Oct. 28, 2013, and claims the priority of Japanese Application No. 2012-245210, filed Nov. 7, 2012, the content of both of which is incorporated herein by reference.

TECHNICAL FIELD

The present invention relates to an exhaust gas control apparatus for an internal combustion engine.

BACKGROUND ART

A technique is known, in which, when the temperature of exhaust gas of an internal combustion engine is low, ammonium nitrate produced by the reaction of ammonia and NOx is held in a selective reduction type NOx catalyst (hereinafter, referred to as an SCR catalyst), thereby suppressing emission of NOx into the air (for example, see PTL 1).

On the other hand, when the temperature of the SCR catalyst or the temperature of exhaust gas is low, it may be difficult to supply ammonia to the SCR catalyst. In this case, it is not possible to increase the amount of ammonia adsorbed on the SCR catalyst. When ammonium nitrate is produced, ammonia is consumed. Accordingly, the amount of ammonia adsorbed on the SCR catalyst decreases. When the temperature of the SCR catalyst is sufficiently increased and the SCR catalyst is activated, if the amount of ammonia adsorbed on the SCR catalyst is small, the amount of ammonia necessary for reducing NOx may be insufficient. If the amount of produced ammonium nitrate is large, even when the temperature of the SCR catalyst is increased, it takes a lot of time until ammonium nitrate is removed. Even when the temperature of the SCR catalyst is increased to a temperature sufficient for reducing NOx, ammonia cannot be adsorbed at a place where ammonium nitrate is present. For this reason, it becomes difficult to purify NOx. Accordingly, while it is possible to suppress the outflow of NOx when producing ammonium nitrate, thereafter, when the temperature of the SCR catalyst is sufficiently increased, NOx flows out due to an insufficient amount of ammonia, and the outflow amount of NOx may be increased as a whole.

CITATION LIST

Patent Literature

PTL 1: Japanese Patent Application Publication No. 2006-320854
PTL 2: Japanese Patent Application Publication No. 2012-031787
PTL 3: Japanese Patent Application Publication No. 2004-346794
PTL 4: Japanese Patent Application Publication No. 2011-102573
PTL 5: Japanese Patent Application Publication No. 2010-101237

SUMMARY OF THE INVENTION

The invention has been accomplished in consideration of the above-described problems, and an object of the invention is to decrease the amount of NOx emitted into the air.

In order to attain the above-described object, an exhaust gas control apparatus for an internal combustion engine according to the invention includes a selective reduction type NOx catalyst which is provided in an exhaust passage of the internal combustion engine to reduce NOx with ammonia as a reducing agent, a supply device which supplies ammonia to the selective reduction type NOx catalyst, a temperature detection device which measures or estimates the temperature of the selective reduction type NOx catalyst, an ammonium nitrate amount detection device which measures or estimates the amount of ammonium nitrate produced on the selective reduction type NOx catalyst, and a control device which calculates the amount of ammonia adsorbed on the selective reduction type NOx catalyst at the present time by subtracting the amount of ammonium nitrate produced on the selective reduction type NOx catalyst from the amount of ammonia adsorbed on the selective reduction type NOx catalyst at the time of starting of the internal combustion engine, and decreases the amount of $NO_2$ flowing into the selective reduction type NOx catalyst when an NOx purification rate estimated from the amount of ammonia adsorbed on the selective reduction type NOx catalyst at the present time is less than a threshold value compared to when the NOx purification rate is equal to or greater than the threshold value.

When the temperature of the SCR catalyst is increased to a certain degree, ammonia reacts with $NO_2$, and ammonium nitrate is produced. Ammonium nitrate stays in the SCR catalyst. Accordingly, $NO_2$ is converted to ammonium nitrate and stored in the SCR catalyst, whereby it is possible to suppress emission of NOx into the air. The temperature at which the reaction of ammonia and $NO_2$ starts is lower than the temperature at which NO is reduced. Accordingly, it is possible to suppress emission of NOx into the air even at a lower temperature.

However, while it is possible to suppress the outflow of NOx when producing ammonium nitrate, thereafter, when the temperature of the SCR catalyst is sufficiently increased, the amount of ammonia may be insufficient. In contrast, when the adsorption amount of ammonia is decreased until an NOx purification rate becomes less than a threshold value, if production of ammonium nitrate is suppressed, it is possible to purify NOx quickly when the temperature of the SCR catalyst is sufficiently increased. Accordingly, it is possible to decrease the NOx purification rate as a whole. The threshold value can be set as an NOx purification rate which becomes a lower limit value of an allowable range or an NOx purification rate which may become the lower limit value of the allowable range.

Decreasing the amount of $NO_2$ flowing into the SCR catalyst includes suppressing an increase in the amount of $NO_2$ by control means or increasing the amount of $NO_2$ by control means and decreasing the degree by which the amount of $NO_2$ is increased. The amount of $NO_2$ may be decreased by decreasing the ratio of $NO_2$ in NOx.

The control device may calculate the amount of ammonia adsorbed on the selective reduction type NOx catalyst at the present time by subtracting the amount of ammonia consumed to produce ammonium nitrate on the selective reduction type NOx catalyst from the amount of ammonia adsorbed on the selective reduction type NOx catalyst at the time of starting of the internal combustion engine.

In the invention, the control device can increase the amount of $NO_2$ flowing into the selective reduction type NOx catalyst by increasing the ratio of $NO_2$ in NOx flowing into the selective reduction type NOx catalyst, and decrease the amount of $NO_2$ flowing into the selective reduction type NOx catalyst by decreasing the ratio of $NO_2$ in NOx flowing into the selective reduction type NOx catalyst.

NOx is primarily consists of NO and $NO_2$. That is, if the ratio of $NO_2$ in NOx is increased, the ratio of NO in NOx is decreased. Even when the ratio of NO and $NO_2$ is changed, the amount of NOx itself is not changed. The temperature at which NO is reduced on the SCR catalyst is higher than the temperature at which the ammonium nitrate is produced from $NO_2$. For this reason, when the temperature of the SCR catalyst is low, the ratio of $NO_2$ is increased, whereby it is possible to suppress the outflow of NOx from the SCR catalyst. When the NOx purification rate estimated from the amount of ammonia adsorbed on the SCR catalyst is less than the threshold value, the ratio of $NO_2$ is decreased, whereby it is possible to suppress the production of ammonium nitrate. With this, it is possible to suppress a decrease in the NOx purification rate.

In the invention, when the temperature of the selective reduction type NOx catalyst is equal to or higher than a predetermined temperature at which ammonia reacts with $NO_2$, the control device may decrease the amount of $NO_2$ flowing into the selective reduction type NOx catalyst when the NOx purification rate estimated from the amount of ammonia adsorbed on the selective reduction type NOx catalyst at the present time is less than the threshold value compared to when the NOx purification rate is equal to or greater than the threshold value.

If the temperature of the SCR catalyst is equal to or higher than the predetermined temperature, ammonia reacts with $NO_2$, and ammonium nitrate is produced. At such a temperature, when the NOx purification rate is less than the threshold value, if the amount of $NO_2$ flowing into the SCR catalyst is decreased, it is possible to decrease the production amount of ammonium nitrate. Accordingly, it is possible to suppress a decrease in NOx purification rate. If the temperature of the SCR catalyst is less than the predetermined value, ammonia does not react with $NO_2$, and ammonium nitrate is not produced. Accordingly, it is not necessary to decrease the amount of $NO_2$ flowing into the SCR catalyst. The predetermined temperature may be a minimum temperature at which production of ammonium nitrate starts with reaction of ammonia and $NO_2$, or may be a temperature at which the ratio of the amount of produced ammonium nitrate to the amount of $NO_2$ flowing into the SCR catalyst is highest. The predetermined temperature may be an arbitrary temperature in a range in which the ratio of the amount of produced ammonium nitrate to the amount of $NO_2$ flowing into the SCR catalyst is changed with an increase in the temperature of the SCR catalyst.

In the invention, when the temperature of the selective reduction type NOx catalyst is lower than a temperature enabling reduction of NO, the control device may decrease the amount of $NO_2$ flowing into the selective reduction type NOx catalyst when the NOx purification rate estimated from the amount of ammonia adsorbed on the selective reduction type NOx catalyst at the present time is less than the threshold value compared to when the NOx purification rate is equal to or greater than the threshold value.

If the temperature of the SCR catalyst is increased to the temperature enabling reduction of NO, even when ammonium nitrate is not produced, it is possible to reduce NO and $NO_2$. For this reason, it is not necessary to produce ammonium nitrate. If the temperature of the SCR catalyst is increased, it is not possible to produce ammonium nitrate. Accordingly, it is not necessary to increase the amount of $NO_2$ flowing into the SCR catalyst. The amount of $NO_2$ flowing into the SCR catalyst is decreased and the amount of NO is increased, whereby it is possible to promote reaction of NO, $NO_2$, and ammonia. Therefore, it is possible to increase the NOx purification rate.

In the invention, the exhaust gas control apparatus may further include a catalyst having an oxidation function and provided upstream of the selective reduction type NOx catalyst, and the control device may decrease the amount of $NO_2$ flowing into the selective reduction type NOx catalyst by increasing the amount of unburned fuel flowing into the catalyst having the oxidation function.

When NO passes through the catalyst having the oxidation function, NO is oxidized by oxygen contained in exhaust gas and becomes $NO_2$. However, at this time, if unburned fuel is contained in exhaust gas, oxygen in exhaust gas is consumed for oxidation of unburned fuel. Even when NO flows into the SCR catalyst as it is, NO does not react with ammonia and passes through the SCR catalyst. Accordingly, the amount of unburned fuel in exhaust gas is decreased, whereby it is possible to suppress consumption of oxygen in exhaust gas through unburned fuel. That is, it is possible to promote the oxidation of NO. Therefore, it is possible to increase the amount of $NO_2$ flowing into the SCR catalyst. When the NOx purification rate estimated from the amount of ammonia adsorbed on the SCR catalyst is less than the threshold value, the amount of $NO_2$ is decreased, whereby it is possible to suppress the production of ammonium nitrate. That is, the amount of unburned fuel flowing into the catalyst having the oxidation function is increased, whereby oxidation of NO is suppressed. Accordingly, it is possible to decrease the amount of $NO_2$.

In the invention, the exhaust gas control apparatus may further include a catalyst having an oxidation function and provided upstream of the selective reduction type NOx catalyst, and an oxygen supply device which supplies oxygen into exhaust gas upstream of the catalyst having the oxidation function, and the control device may decrease the amount of $NO_2$ flowing into the selective reduction type NOx catalyst by decreasing the amount of oxygen supplied into exhaust gas upstream of the catalyst having the oxidation function with the oxygen supply device.

If oxygen is supplied to the catalyst having the oxidation function, NO is easily oxidized on the catalyst having the oxidation function. Accordingly, it is possible to increase the amount of $NO_2$ flowing into the SCR catalyst. When the NOx purification rate estimated from the amount of ammonia adsorbed on the SCR catalyst is less than the threshold value, the amount of $NO_2$ is decreased, whereby it is possible to suppress the production of ammonium nitrate. That is, the amount of oxygen flowing into the catalyst having the oxidation function is decreased, whereby oxidation of NO is suppressed. Accordingly, it is possible to decrease the amount of $NO_2$.

In the invention, the exhaust gas control apparatus may further include a catalyst having an oxidation function and provided upstream of the selective reduction type NOx catalyst, and heat supply means for supplying heat to the catalyst having the oxidation function, and the control means may cause the heat supply means to supply heat to the catalyst having the oxidation function until the temperature of the selective reduction type NOx catalyst becomes equal to or higher than the predetermined temperature.

The temperature of the catalyst having the oxidation function is increased quickly, whereby it is possible to make NO be oxidizable quickly. Accordingly, it is possible to increase the amount of $NO_2$ flowing into the SCR catalyst beforehand.

According to the invention, it is possible to decrease the amount of NOx emitted into the air.

BRIEF DESCRIPTION OF THE DRAWINGS

FIG. 11 is a diagram showing the relationship of an ammonia adsorption amount ($NH_3$ adsorption amount) and an NOx purification rate on an SCR catalyst.

MODES FOR CARRYING OUT THE INVENTION

Figure 1:
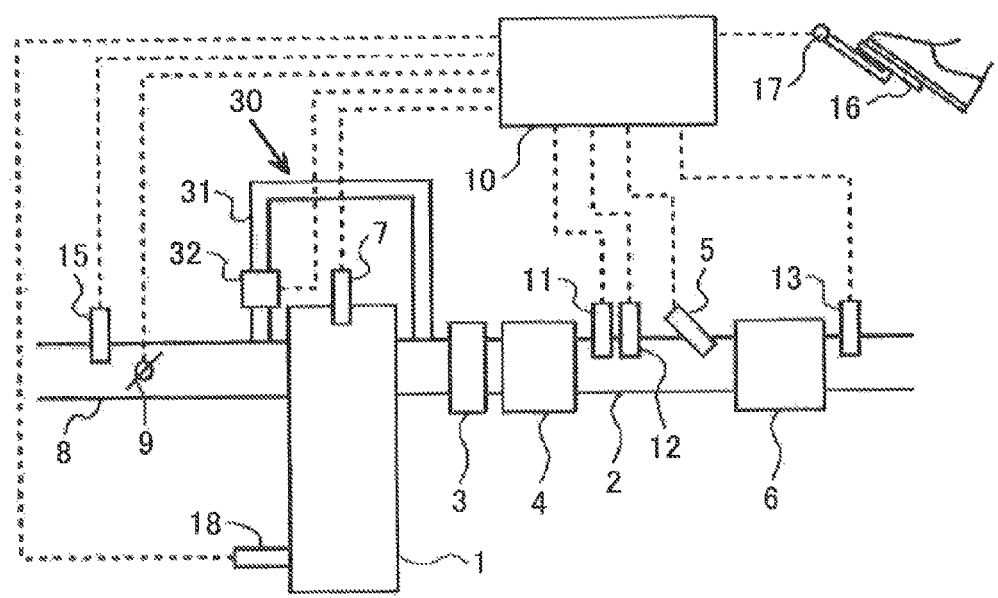
FIG. 1 is a diagram showing the schematic configuration of an internal combustion engine according to Example 1.

Hereinafter, modes for carrying out the invention will be illustratively described in detail in connection with examples referring to the drawings. However, dimensions, materials, shapes, relative arrangements, and the like of components described in the examples do not limit the scope of the invention to only the dimensions, the materials, the shapes, the relative arrangements, and the like unless specifically noted otherwise.

Example 1

FIG. 1 is a diagram showing the schematic configuration of an internal combustion engine according to this example. An internal combustion engine 1 shown in FIG. 1 is a diesel engine.

An exhaust passage 2 is connected to the internal combustion engine 1. In the middle of the exhaust passage 2, an oxidation catalyst 3, a filter 4, a reducing agent injection valve 5, and a selective reduction type NOx catalyst 6 (hereinafter, referred to as an SCR catalyst 6) are provided in order from the upstream side.

The oxidation catalyst 3 may be a catalyst having an oxidation function, for example, a three way catalyst or an occlusion reduction type NOx catalyst.

The filter 4 collects particulate matters (PM) in exhaust gas. A catalyst is carried on the filter 4. In this case, the oxidation catalyst 3 is not necessarily required. The PM is collected by the filter 4, whereby the PM is gradually deposited on the filter 4. So-called regeneration processing of the filter 4 for forcibly increasing the temperature of the filter 4 is executed, whereby the PM deposited on the filter 4 can be oxidized and removed. For example, unburned fuel (HC or CO) is supplied to the oxidation catalyst 3, whereby the temperature of the filter 4 can be increased.

The reducing agent injection valve 5 is opened when injecting a reducing agent and is closed when stopping the injection of the reducing agent. As the reducing agent, ammonia ($NH_3$) is used. The reducing agent injection valve 5 may inject ammonia or may inject urea. Urea injected from the reducing agent injection valve 5 is hydrolyzed by heat of exhaust gas or heat from the SCR catalyst 6 to become ammonia and is adsorbed on the SCR catalyst 6. Ammonia is used as the reducing agent on the SCR catalyst 6. That is, a material which is converted to ammonia, or ammonia is supplied from the reducing agent injection valve 5. Ammonia or urea may be supplied in any state of gas, liquid (aqueous solution), or solid. In this example, the reducing agent injection valve 5 corresponds to a supply device in the invention. In this example, a case where urea water is injected from the reducing agent injection valve 5 will be described.

The SCR catalyst 6 has a function of absorbing the reducing agent and selectively reducing NOx by the adsorbed reducing agent when NOx passes therethrough. Accordingly, if ammonia is adsorbed as the reducing agent on the SCR catalyst 6 in advance, NOx can be reduced by ammonia on the SCR catalyst 6.

A temperature sensor 11 which detects the temperature of exhaust gas, and a upstream-side NOx sensor 12 which detects the NOx concentration in exhaust gas are attached to the exhaust passage 2 downstream of the filter 4 and upstream of the SCR catalyst 6. The temperature of the filter 4 or the temperature of the SCR catalyst 6 can be detected by the temperature sensor 11. The NOx concentration in exhaust gas flowing into the SCR catalyst 6 can be detected by the upstream-side NOx sensor 12. A downstream-side NOx sensor 13 which detects the NOx concentration in exhaust gas is attached to the exhaust passage 2 downstream of the SCR catalyst 6.

A temperature sensor may be attached downstream of the SCR catalyst 6, and the temperature of the SCR catalyst 6 may be detected by the temperature sensor. The temperature of the SCR catalyst 6 may be estimated based on the operation state of the internal combustion engine 1. For example, since there is the correlation between an engine speed, a fuel injection amount, and an intake air amount and the temperature of the SCR catalyst 6, the correlation may be found and mapped by an experiment or the like in advance. In this example, the temperature sensor 11 corresponds to a temperature detection device in the invention.

The internal combustion engine 1 is provided with a fuel injection valve 7 from which fuel is injected into a cylinder. An intake passage 8 is connected to the internal combustion engine 1. In the middle of the intake passage 8, a throttle 9 which adjusts the intake air amount of the internal combustion engine 1 is provided. An air flow meter 15 which detects the intake air amount of the internal combustion engine 1 is attached to the intake passage 8 upstream of the throttle 9.

The internal combustion engine 1 is provided with an EGR device 30 which recirculates a part of exhaust gas flowing through the exhaust passage 2 to the intake passage 8. The EGR device 30 is provided with an EGR passage 31 which connects the exhaust passage 2 upstream of the oxidation catalyst 3 and the intake passage 8 downstream of the throttle 9, and an EGR valve 32 which adjusts the passage cross-sectional area of the EGR passage 31.

The internal combustion engine 1 configured as described above is provided with an ECU 10 as an electronic control unit which controls the internal combustion engine 1. The ECU 10 controls the internal combustion engine 1 according to the operation conditions of the internal combustion engine 1 or a request from a driver.

To the ECU 10, in addition to the sensors, an accelerator opening sensor 17 which outputs an electrical signal according to the amount of pedaling of the accelerator pedal 16 by the driver and detects an engine load, and a crank position sensor 18 which detects an engine speed are connected through electric wiring. The output signals of various sensors are input to the ECU 10.

To the ECU 10, the reducing agent injection valve 5, the fuel injection valve 7, the throttle 9, and the EGR valve 32 are connected through electric wiring. The timing of switching of the reducing agent injection valve 5 and the fuel injection valve 7 and the opening of the throttle 9 and the EGR valve 32 are controlled by the ECU 10.

The ECU 10 adjusts the ratio of the amount of $NO_2$ to the total amount of NOx flowing into the SCR catalyst 6 according to the temperature of the SCR catalyst 6. Since NOx is primarily consists of NO and $NO_2$, the ratio of NO and $NO_2$ may be adjusted.

The SCR catalyst 6 cannot reduce NOx if the temperature of the SCR catalyst 6 is not increased to a certain degree. That is, NOx cannot be purified until the temperature of the SCR catalyst 6 reaches a temperature enabling NOx purification. When the SCR catalyst 6 absorbs ammonia, while the temperature of the SCR catalyst 6 is increased, $NO_2$ first reacts with ammonia, and if the temperature is further increased, NO and $NO_2$ react with ammonia. That is, NO and $NO_2$ are different in minimum temperature at which NO and $NO_2$ react with ammonia on the SCR catalyst 6.

Figure 2:
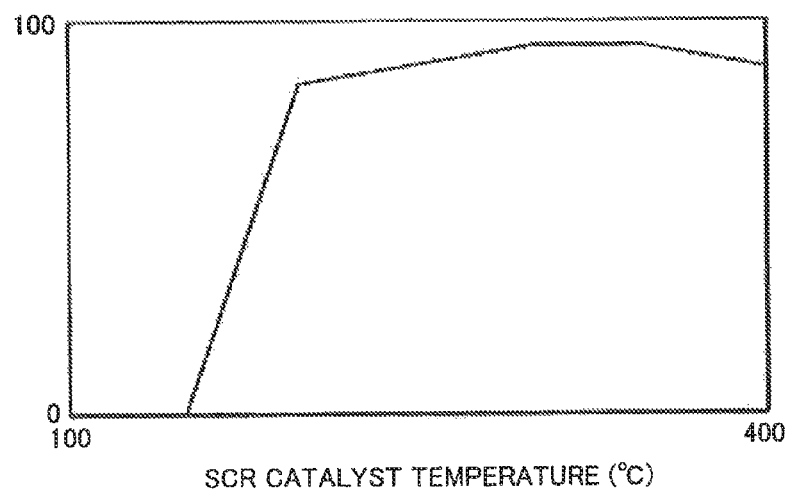
FIG. 2 is a diagram showing the general relationship between the temperature of an SCR catalyst and an NOx purification rate.

FIG. 2 is a diagram showing the general relationship between the temperature of the SCR catalyst 6 and an NOx purification rate. NOx contains NO and $NO_2$. In general, it is recognized that, when the temperature of the SCR catalyst 6 is equal to or higher than, for example, 180° C., high NOx purification capability can be maintained on the SCR catalyst 6. However, even when the temperature of the SCR catalyst 6 is lower than 180° C., $NO_2$ reacts with ammonia and ammonium nitrate is produced.

Figure 3:
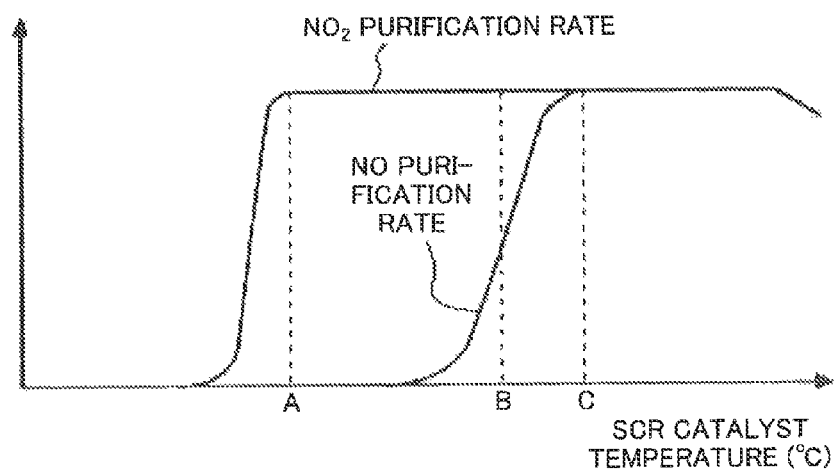
FIG. 3 is a diagram showing the relationship between a temperature of an SCR catalyst and purification rates of NO and $NO_2$.

FIG. 3 is a diagram showing the relationship between the temperature of the SCR catalyst 6 and purification rates of NO and $NO_2$. In FIG. 3, a temperature represented by A is a temperature when the purification rate of $NO_2$ is increased. A temperature represented by B is a temperature after the purification rate of $NO_2$ is increased and while the purification rate of NO is increased. A temperature represented by C is a temperature when the purification rate of NO is increased.

When the temperature of the SCR catalyst 6 is between A and B, the following reaction primarily occurs.

$$2NO_2+2NH_3 \rightarrow NH_4NO_3+N_2+H_2O \qquad (1)$$

When the temperature of the SCR catalyst 6 is between B and C, the following reaction primarily occurs.

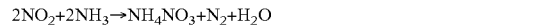
$$2NO_2+2NH_3 \rightarrow NH_4NO_3+N_2+H_2O$$

$$NO+NO_2+2NH_3 \rightarrow 2N_2+3H_2O \qquad (2)$$

When the temperature of the SCR catalyst 6 is higher than C, the following reaction primarily occurs.

$$NO+NO_2+2NH_3 \rightarrow 2N_2+3H_2O$$

$$4NO+4NH_3+O_2 \rightarrow 4N_2+6H_2O \qquad (3)$$

$$6NO_2+8NH_3 \rightarrow 7N_2+12H_2O \qquad (4)$$

That is, at the temperature between A and B, ammonia reacts with $NO_2$; however, ammonia hardly reacts with NO. Accordingly, when the temperature of the SCR catalyst 6 is the temperature between A and B, if NO flows into the SCR catalyst 6, NO is not reduced on the SCR catalyst 6 and flows out of the SCR catalyst 6. When the temperature of the SCR catalyst 6 is the temperature between A and B, if $NO_2$ flows into the SCR catalyst 6, ammonium nitrate ($NH_4NO_3$) is produced on the SCR catalyst 6, and ammonium nitrate is adsorbed on the SCR catalyst 6. Therefore, it is possible to suppress the outflow of $NO_2$ from the SCR catalyst 6.

That is, when the temperature of the SCR catalyst 6 is the temperature between A and B, the ratio of $NO_2$ in NOx flowing into the SCR catalyst 6 is increased, whereby it is possible to suppress the outflow of NOx from the SCR catalyst 6. Accordingly, when the temperature of the SCR catalyst 6 is the temperature between A and B, the ECU 10 increases the ratio of $NO_2$ in NOx flowing into the SCR catalyst 6 (increases the amount of $NO_2$). Then, in this example, the amount of $NO_2$ is increased by decreasing the amount of unburned fuel (HC and CO) emitted from the internal combustion engine 1, and the amount of $NO_2$ is decreased by increasing the amount of unburned fuel (HC and CO) emitted from the internal combustion engine 1.

If oxygen is present in exhaust gas, NO can be oxidized into $NO_2$. However, oxygen easily reacts with HC and CO rather than NO. Accordingly, if HC and CO are present in exhaust gas, the oxidation of NO is hindered. Therefore, the amount of HC and CO in exhaust gas is decreased, whereby it is possible to promote the oxidation of NO.

Then, in order to decrease unburned fuel emitted from the internal combustion engine 1, the ECU 10 advances the timing of main injection in the fuel injection valve 7, or decreases the amount of sub injection (after injection) after the main injection. The after injection may be stopped.

When each catalyst is at a low temperature, a temperature increasing combustion mode which is a combustion mode for increasing the temperature of the catalyst is executed. The temperature increasing combustion mode is a combustion mode in which the timing of the main injection in the fuel injection valve 7 is advanced, the after injection is executed after the main injection, or the amount of the after injection is increased, thereby causing unburned fuel to be emitted from the internal combustion engine 1 or causing high-temperature gas to be emitted from the internal combustion engine 1. Unburned fuel is emitted from the internal combustion engine 1, whereby it is possible to increase the temperature of the catalyst by oxidizing unburned fuel on the catalyst. The temperature increasing combustion mode is executed until the temperature of the oxidation catalyst 3 and the SCR catalyst 6 is sufficiently increased.

Then, after the temperature of the oxidation catalyst 3 and the SCR catalyst 6 is sufficiently increased and the NOx purification rate falls within an allowable range, the main injection timing or the after injection amount is determined according to the operation state (engine speed or engine load) of the internal combustion engine 1. Hereinafter, such a combustion mode is referred to as a normal combustion mode.

When the temperature of the SCR catalyst 6 is the temperature between A and B, the emission amount of unburned fuel is decreased compared to when the temperature increasing combustion mode is executed, thereby promoting the oxidation of NO. The emission amount of unburned fuel at this time is equal to or greater than that in the normal combustion mode and less than that in the temperature increasing combustion mode. Hereinafter, such a combustion mode is referred to as an ammonium nitrate producing combustion mode.

In the related art, the temperature increasing combustion mode is executed until the temperature of the SCR catalyst 6 becomes the temperature (for example, 180° C.) represented by C at which the NOx purification rate is sufficiently increased, and the normal combustion mode is executed when the temperature of the SCR catalyst 6 is equal to or higher than the temperature represented by C. In this example, while the temperature of the SCR catalyst 6 is increased, the temperature increasing combustion mode is executed initially; however, if the temperature of the SCR catalyst 6 reaches the temperature represented by A, the ammonium nitrate producing combustion mode is executed, if the temperature of the SCR catalyst 6 becomes equal to or higher than the temperature represented by B, the temperature increasing combustion mode is executed until the temperature of the SCR catalyst 6 reaches the temperature (for example, 180° C.) represented by C, and when the temperature of the SCR catalyst 6 is equal to or higher than the temperature represented by C, the normal combustion mode is executed.

In this way, when the temperature of the SCR catalyst 6 is the temperature between A and B, the amount of unburned fuel (HC and CO) flowing into the oxidation catalyst 3 or the SCR catalyst 6 is decreased, whereby it is possible to promote the oxidation of NO to increase the ratio of $NO_2$ in NOx. With this, since it is possible to produce more ammonium nitrate on the SCR catalyst 6, it is possible to suppress the passage of NOx through the SCR catalyst 6. That is, it is possible to improve the NOx purification rate on the SCR catalyst 6.

In this example, although the temperature when the purification rate of $NO_2$ is sufficiently increased is referred to as A, and the ammonium nitrate producing combustion mode is started from the temperature of A, alternatively, the ammonium nitrate producing combustion mode may be started from a temperature at which the purification rate of $NO_2$ starts to be increased. The ammonium nitrate producing combustion mode may be started while the purification rate of $NO_2$ is increased. The ammonium nitrate producing combustion mode may be stated between the temperature at which ammonium nitrate starts to be produced and the temperature at which the production amount of ammonium nitrate is maximized.

For example, when the temperature at which the ammonium nitrate producing combustion mode is started is brought close to the temperature when the purification rate of $NO_2$ starts to be increased, the emission of HC and CO is limited at lower temperature, and the production amount of ammonium nitrate is increased. However, an increase in temperature of the oxidation catalyst 3 and the SCR catalyst 6 is slow. Accordingly, it takes a lot of time until the SCR catalyst 6 is activated and transition to the normal combustion mode is made. For this reason, fuel consumption may be deteriorated.

On the contrary, when the temperature at which the ammonium nitrate producing combustion mode is started is increased, it is possible to promote an increase in temperature of the oxidation catalyst 3 and the SCR catalyst 6; however, the production amount of ammonium nitrate is decreased. For this reason, the amount of NOx emitted into the air may be increased. The optimum value of the temperature at which the ammonium nitrate producing combustion mode is started may be found in advance by an experiment, a simulation, or the like in consideration of, for example, the emission amount of NOx into the air or fuel consumption and may be stored in the ECU 10. For example, the temperature at which the ammonium nitrate producing combustion mode is started may be determined such that the amount of NOx flowing out of the SCR catalyst 6 is decreased as a whole. The temperature may be changed according to the operation conditions.

In this example, although the temperature after the purification rate of $NO_2$ is increased and while the purification rate of NO is increased is referred to as B, and the temperature increasing combustion mode is executed after the temperature of B is reached, alternatively, the temperature increasing combustion mode may be started at the temperature between the temperature at which the purification rate of NO starts to be increased and the temperature (the temperature of C) at which the purification rate of NO is sufficiently increased. The optimum value of the temperature at which the temperature increasing combustion mode is started may be found in advance by an experiment, a simulation, or the like in consideration of, for example, the emission amount of NOx into the air or fuel consumption and may be stored in the ECU 10. For example, the temperature at which the temperature increasing combustion mode is started may be determined such that the amount of NOx flowing out of the SCR catalyst 6 is decreased as a whole. The temperature may be changed according to the operation conditions.

Figure 4:
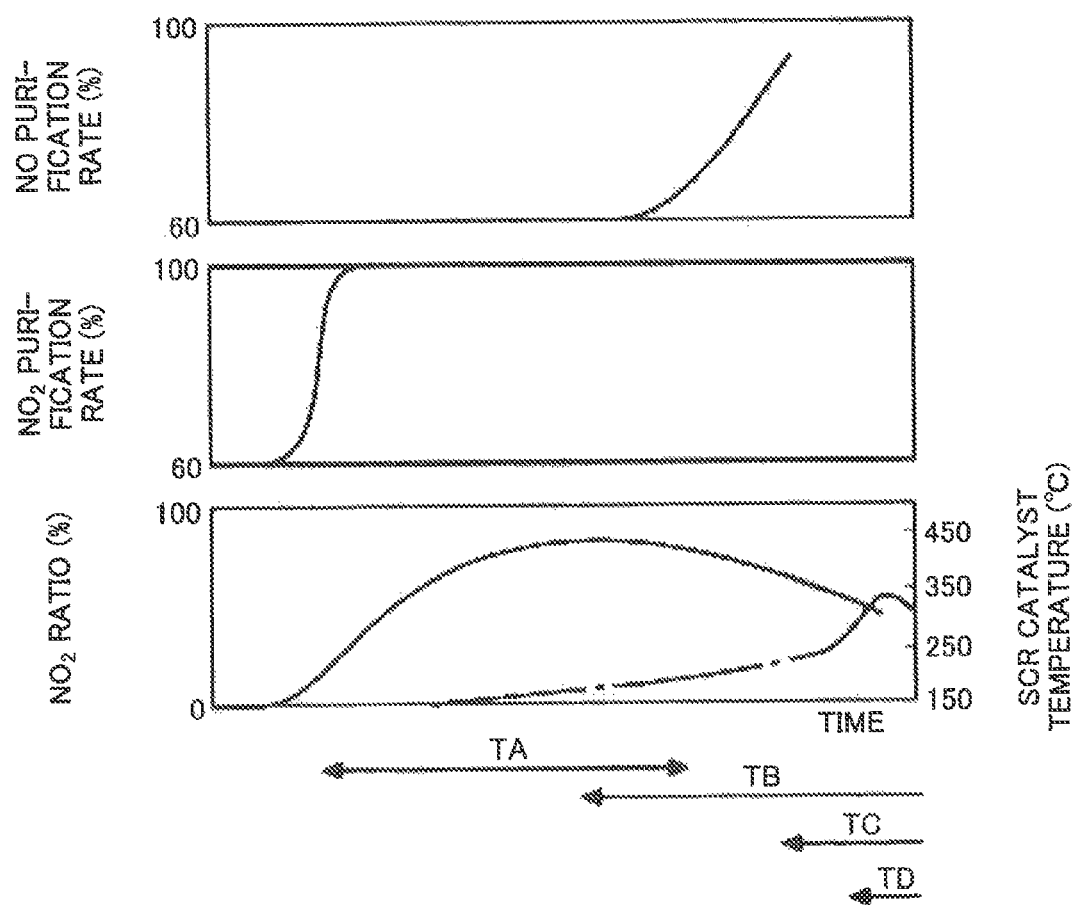
FIG. 4 is a time chart showing transition of an NO purification rate, an $NO_2$ purification rate, and an $NO_2$ ratio.

FIG. 4 is a time chart showing the transition of the NO purification rate, the $NO_2$ purification rate, and the $NO_2$ ratio. The $NO_2$ ratio is the ratio of NO and $NO_2$, and has a great value when $NO_2$ is increased with respect to NO. A one-dot-chain line represents the temperature of the SCR catalyst 6.

In FIG. 4, TA is a period during which the reaction of (1) occurs, and a period during which ammonium nitrate is produced on the SCR catalyst 6. TB is a period during which the temperature of the SCR catalyst 6 becomes equal to or higher than, for example, 180° C., and a period during which the reaction of (2) occurs. TC is a period during which the temperature of the SCR catalyst 6 becomes equal to or higher than, for example, 220° C., and a period during which the reaction of (3) occurs. TD is a period during which the temperature of the SCR catalyst 6 becomes equal to or higher than, for example, 280° C., and a period during which the reaction of (4) occurs.

In this way, the reaction of NO and $NO_2$ is different according to the temperature of the SCR catalyst 6, and $NO_2$ has a purification rate higher than NO from a low temperature.

Figure 5:
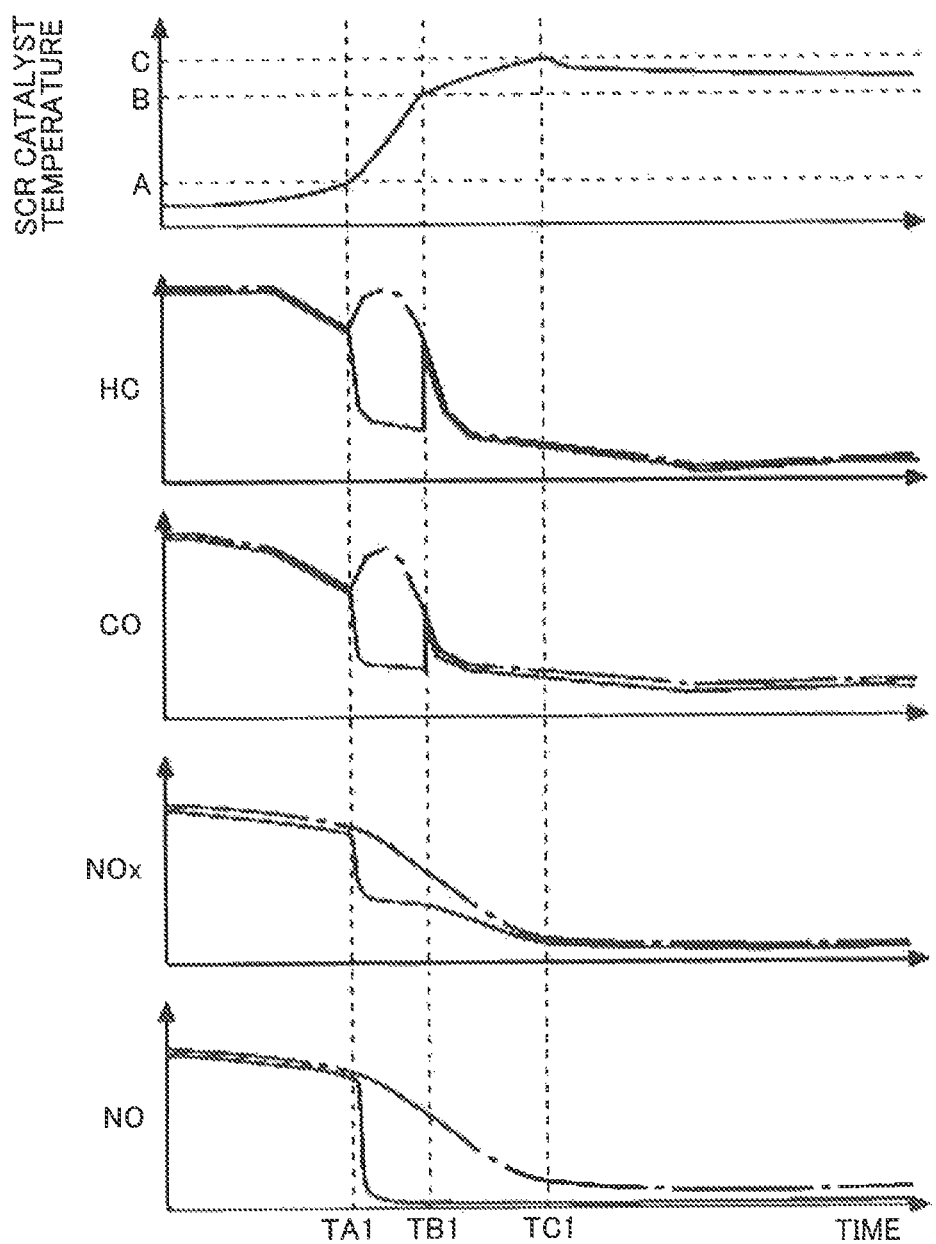
FIG. 5 is a time chart showing transition of a temperature of an SCR catalyst, the amount of HC and the amount of CO emitted from the internal combustion engine, an NOx concentration (or NOx amount) downstream of the SCR catalyst, and an NO concentration (or NO amount) downstream of the SCR catalyst.

FIG. 5 is a time chart showing the transition of the temperature of the SCR catalyst 6, the amount of HC and the amount of CO emitted from the internal combustion engine 1, an NOx concentration (or NOx amount) downstream of the SCR catalyst 6, and an NO concentration (or NO amount) downstream of the SCR catalyst 6.

At the time TA1, the temperature of the SCR catalyst 6 reaches the temperature of A. At the time TB1, the temperature of the SCR catalyst 6 reaches the temperature of B. At the time TC1, the temperature of the SCR catalyst 6 reaches the temperature of C. A solid line represents a case where the ammonium nitrate producing combustion mode is executed in a period from TA1 to TB1, and a one-dot-chain line represents a case where the temperature increasing combustion mode is executed in a period from TA1 to TB1, instead of the ammonium nitrate producing combustion mode.

In the case represented by the solid line of FIG. 5, the ammonium nitrate producing combustion mode is executed in the period from TA1 to TB1, the temperature increasing combustion mode is executed in a period from TB1 to TC1, and the normal combustion mode is executed in a period after TC1. In the one-dot-chain line of FIG. 5, the temperature increasing combustion mode is executed in the period from TA1 to TC1, and the normal combustion mode is executed in the period after TC1.

In this way, in the related art (one-dot-chain line), the amount of HO and the amount of CO emitted from the internal combustion engine 1 are increased after the time TA1, thereby achieving an increase in temperature of the SCR catalyst 6. In this case, since HC and CO are oxidized on the oxidation catalyst 3 and the SCR catalyst 6, the amount of oxygen in exhaust gas is decreased. For this reason, the oxidation of NO is suppressed. Then, at this time, since NO does not react with ammonia on the SCR catalyst 6, NO passes through the SCR catalyst 6. That is, the NOx concentration and the NO concentration downstream of the SCR catalyst 6 are comparatively high.

In this example (solid line), since the emission amount of HC and CO is decreased in the period from TA1 to TB1, oxygen reacts with NO on the oxidation catalyst 3 and the SCR catalyst 6, and $NO_2$ is produced. That is, the amount of NO which passes through the SCR catalyst 6 can be decreased at the temperature at this time, and the amount of $NO_2$ which reacts with ammonia on the SCR catalyst 6 to produce ammonium nitrate can be increased. With this, the NOx concentration and the NO concentration downstream of the SCR catalyst 6 are comparatively low.

On the other hand, since $NO_2$ in exhaust gas reacts with ammonia adsorbed on the SCR catalyst 6 and ammonium nitrate is produced, the ammonia adsorption amount on the SCR catalyst 6 is decreased with an increase in the production amount of ammonium nitrate. Even when urea water is supplied, there is no change to ammonia until the temperature of the SCR catalyst 6 reaches the temperature of B. Accordingly, it is not possible to increase the ammonia adsorption amount. Although ammonium nitrate is decomposed at about 210° C. and is removed from the SCR catalyst 6, if the production amount of ammonium nitrate is increased, it takes a lot of time until all ammonium nitrate are decomposed. Then, ammonia cannot be adsorbed at a place where ammonium nitrate is present on the SCR catalyst 6.

That is, if the production amount of ammonium nitrate is increased, even when the temperature of the SCR catalyst 6 reaches a temperature enabling NOx purification, ammonia may be insufficient and NOx purification may be difficult. Then, if the amount of NOx emitted into the air due to insufficiency of NOx exceeds the amount of the NOx suppressed in emission into the air due to the production of ammonium nitrate, the emission amount of NOx into the air can be increased as a whole.

In contrast, in this example, the production amount of ammonium nitrate is limited such that the ammonia adsorption amount necessary for setting the NOx purification rate within the allowable range can be maintained. The ECU 10 estimates the amount (hereinafter, referred to as a production amount of ammonium nitrate) of ammonium nitrate produced on the SCR catalyst 6 and the amount (hereinafter, referred to as an ammonia adsorption amount) of ammonia adsorbed on the SCR catalyst 6, and suppresses the production of ammonium nitrate such that the ammonia adsorption amount with the NOx purification rate within the allowable range can be maintained.

Specifically, a value obtained by subtracting the production amount of ammonium nitrate from the ammonia adsorption amount before ammonium nitrate is produced is set as the ammonia adsorption amount at the present time, and when the ammonia adsorption amount at the present time is less than a threshold value, the ammonium nitrate producing combustion mode is ended and transition to the temperature increasing combustion mode is made. The threshold value may be the ammonia adsorption amount which becomes the lower limit value of the allowable range of the NOx purification rate, or may be a value obtained by adding a certain amount of margin to the ammonia adsorption amount which becomes the lower limit value. After the ammonium nitrate producing combustion mode is ended, transition to the normal combustion mode may be made. The ammonia adsorption amount at the present time may be a value obtained by subtracting the amount of ammonia consumed to produce ammonium nitrate from the ammonia adsorption amount before ammonium nitrate is produced.

On the other hand, when ammonium nitrate is decomposed, the following reaction can occur.

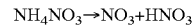

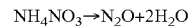

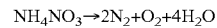

That is, while $N_2O$ can be generated, the emission amount of $N_2O$ is also required to be decreased. In contrast, the production amount of ammonium nitrate is decreased, whereby it is possible to decrease the emission amount of $N_2O$. In this case, the threshold value may be the ammonia adsorption amount which becomes an upper limit value of an allowable range of the emission amount of $N_2O$, or a value obtained by adding a certain amount of margin to the ammonia adsorption amount which becomes the upper limit value.

The production amount of ammonium nitrate may be estimated that all $NO_2$ flowing into the SCR catalyst 6 are changed to ammonium nitrate, or may be estimated that $NO_2$ is changed to ammonium nitrate at a predetermined ratio. $NO_2$ flowing into the SCR catalyst 6 includes $NO_2$ which is produced when NO is oxidized on the SCR catalyst 6. The amount of $NO_2$ flowing into the SCR catalyst 6 is obtained based on the amount of NO and the amount of $NO_2$ emitted from the internal combustion engine 1 and the oxidation amount of NO into $NO_2$ on the oxidation catalyst 3 and the SCR catalyst 6. The oxidation amount of NO into $NO_2$ on the oxidation catalyst 3 and the SCR catalyst 6 is calculated based on the temperature of the SCR catalyst 6, the flow rate of exhaust gas found from the intake air amount, and the like. The amount of ammonia consumed to produce ammonium nitrate can be calculated based on the estimated production amount of ammonium nitrate.

Figure 6:
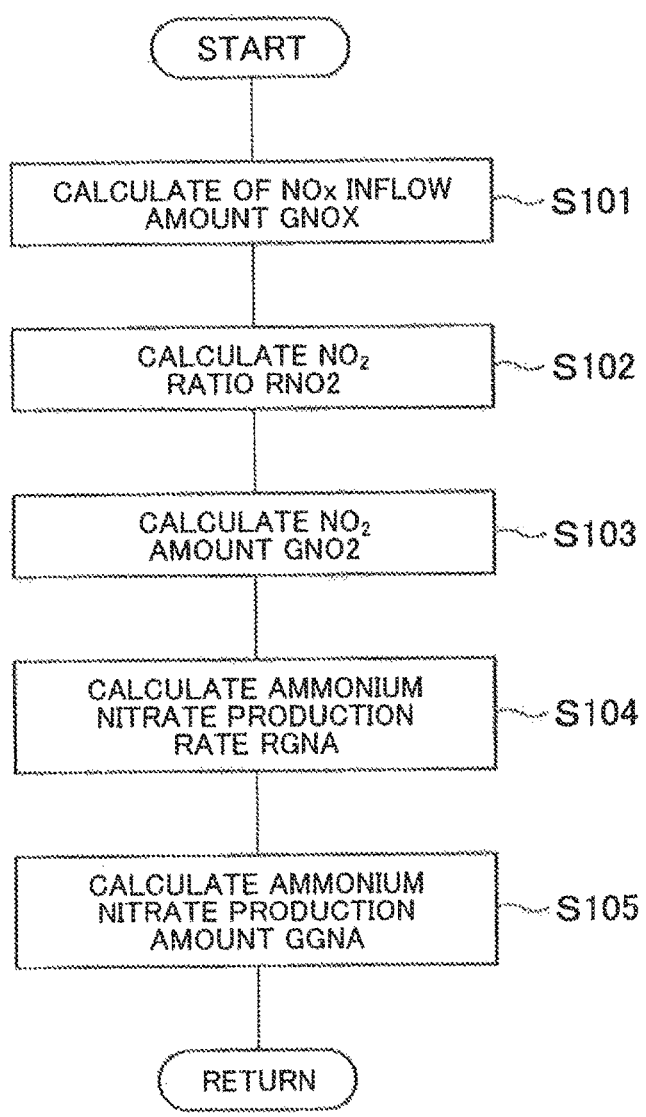
FIG. 6 is a flowchart showing the flow of calculation of a production amount of ammonium nitrate.

FIG. 6 is a flowchart showing the flow of calculation of an ammonium nitrate production amount GGNA. This routine is repeatedly executed by the ECU 10 at every predetermined time. In this example, the ECU 10 which processes the flow shown in FIG. 6 corresponds to an ammonium nitrate amount detection device in the invention.

In Step S101, the amount of NOx (NOx inflow amount GNOX) flowing into the SCR catalyst 6 is calculated. For example, the NOx inflow amount GNOX can be calculated based on the NOx concentration in exhaust gas flowing into the SCR catalyst 6 detected by the upstream-side NOx sensor 12 and the intake air amount detected by the air flow meter 15. Since the operation state (engine speed, fuel injection amount, or the like) of the internal combustion engine 1 has a correlation with the NOx inflow amount GNOX, the correlation may be found and mapped in advance by an experiment or a simulation, and may be stored in the ECU 10. The NOx inflow amount GNOX may be calculated using a model based on oxygen concentration in intake air.

In Step S102, the ratio ($NO_2$ ratio RNO2) of $NO_2$ in NOx flowing into the SCR catalyst 6 is calculated. Since the ratio of $NO_2$ in NOx emitted from the internal combustion engine 1 has a correlation with the engine speed, the fuel injection amount, the temperature in the cylinder, and the like, the ratio of $NO_2$ can be found by finding and mapping the correlation in advance by an experiment or a simulation, and by storing the correlation in the ECU 10. The ratio of $NO_2$ is increased due to the oxidation of NO on the oxidation catalyst 3 and the SCR catalyst 6. The ratio of $NO_2$ is decreased due to the reduction of $NO_2$ by HC and CO. In this way, the amount of change of the ratio of $NO_2$ on each catalyst is calculated as a correction coefficient RCNO2. The correction coefficient RCNO2 is determined in consideration of the oxidation amount of NO on each catalyst and the reduction amount of $NO_2$ by HC and CO. Since the correction coefficient RCNO2 has a correlation with the temperature of each catalyst, the amount of HC and the amount of CO flowing into each catalyst, the flow rate of exhaust gas, and the like, the correlation is found and mapped in advance by an experiment or a simulation. The $NO_2$ ratio RNO2 can be found by multiplying the ratio of $NO_2$ in NOx emitted from the combustion engine 1 by the correction coefficient internal RCNO2.

In Step S103, the $NO_2$ amount GNO2 flowing into the SCR catalyst 6 is calculated. The $NO_2$ amount GNO2 flowing into the SCR catalyst 6 is calculated by multiplying the NOx inflow amount GNOX calculated in Step S101 by the $NO_2$ ratio RNO2 calculated in Step S102.

In Step S104, the rate (ammonium nitrate production rate RGNA) at which $NO_2$ is changed to ammonium nitrate in the SCR catalyst 6 is calculated. Since the ammonium nitrate production rate RGNA has a correlation with the temperature of the SCR catalyst 6, the correlation is found and mapped in advance by an experiment or a simulation, and is stored in the ECU 10.

Figure 7:
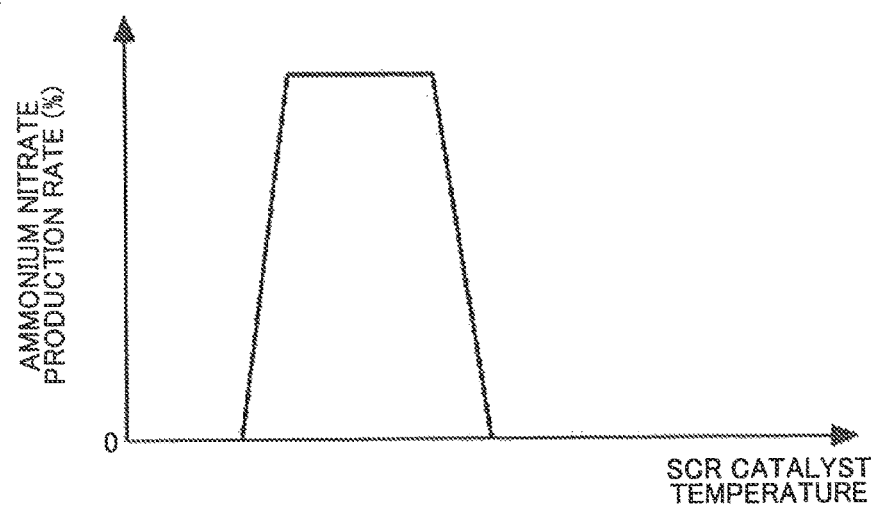
FIG. 7 is a diagram showing the relationship between a temperature of an SCR catalyst and an ammonium nitrate production rate.

FIG. 7 is a diagram showing the relationship between the temperature of the SCR catalyst 6 and the ammonium nitrate production rate RGNA. In this way, the ammonium nitrate production rate RGNA changes according to the temperature of the SCR catalyst 6. When the flow rate of exhaust gas is increased, the ammonium nitrate production rate RGNA is decreased. Accordingly, a two-dimensional map considering the flow rate of exhaust gas may be used.

In Step S105, the ammonium nitrate production amount GGNA is calculated. The ammonium nitrate production amount GGNA is calculated by multiplying the $NO_2$ amount GNO2 flowing into the SCR catalyst 6 calculated in Step S103 by the ammonium nitrate production rate RGNA calculated in Step S104. Since the ammonium nitrate production amount GGNA is calculated as a production amount per unit time, this value is integrated, whereby it is possible to calculate the total production amount of ammonium nitrate. In Step S105, the amount of ammonia consumed to produce ammonium nitrate may be calculated based on the ammonium nitrate production amount GGNA.

The amount of ammonium nitrate adsorbed on the SCR catalyst 6 may be calculated by subtracting the amount GDNA of ammonium nitrate decomposed on the SCR catalyst 6 from the integrated value of the ammonium nitrate production amount GGNA calculated in Step S105. Since the amount GDNA of ammonium nitrate decomposed on the SCR catalyst 6 has a correlation with the temperature of the SCR catalyst 6, the correlation may be found and mapped in advance by an experiment or a simulation, and may be stored in the ECU 10.

Figure 8:
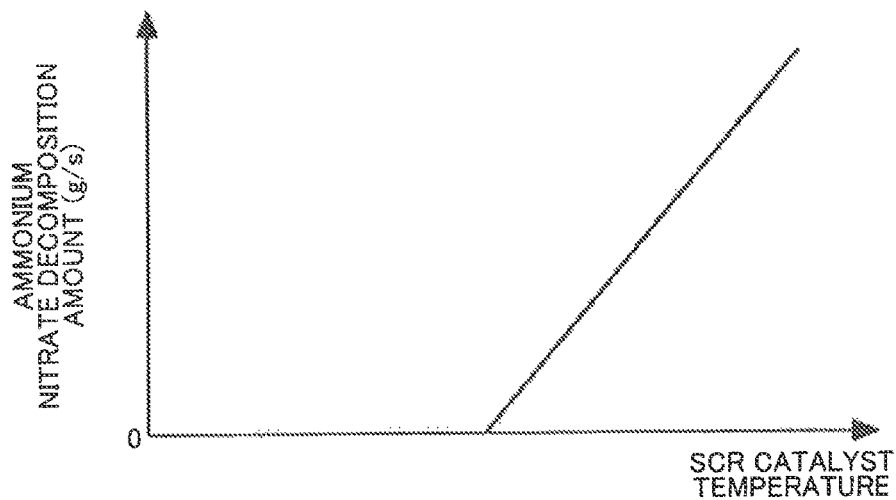
FIG. 8 is a diagram showing the relationship between a temperature of an SCR catalyst and a decomposition amount of ammonium nitrate.

FIG. 8 is a diagram showing the relationship between the temperature of the SCR catalyst 6 and the decomposition amount of ammonium nitrate. In this way, if the temperature of the SCR catalyst 6 is increased to a certain degree, when the temperature of the SCR catalyst 6 is increased, the decomposition amount of ammonium nitrate per unit time is increased. When the remaining amount of ammonium nitrate is large, the decomposition amount per unit time is increased. Accordingly, a two-dimensional map considering the remaining amount of ammonium nitrate may be used. When the flow rate of exhaust gas is high, the decomposition amount is increased. Accordingly, correction may be made according to the flow rate of exhaust gas.

Figure 9:
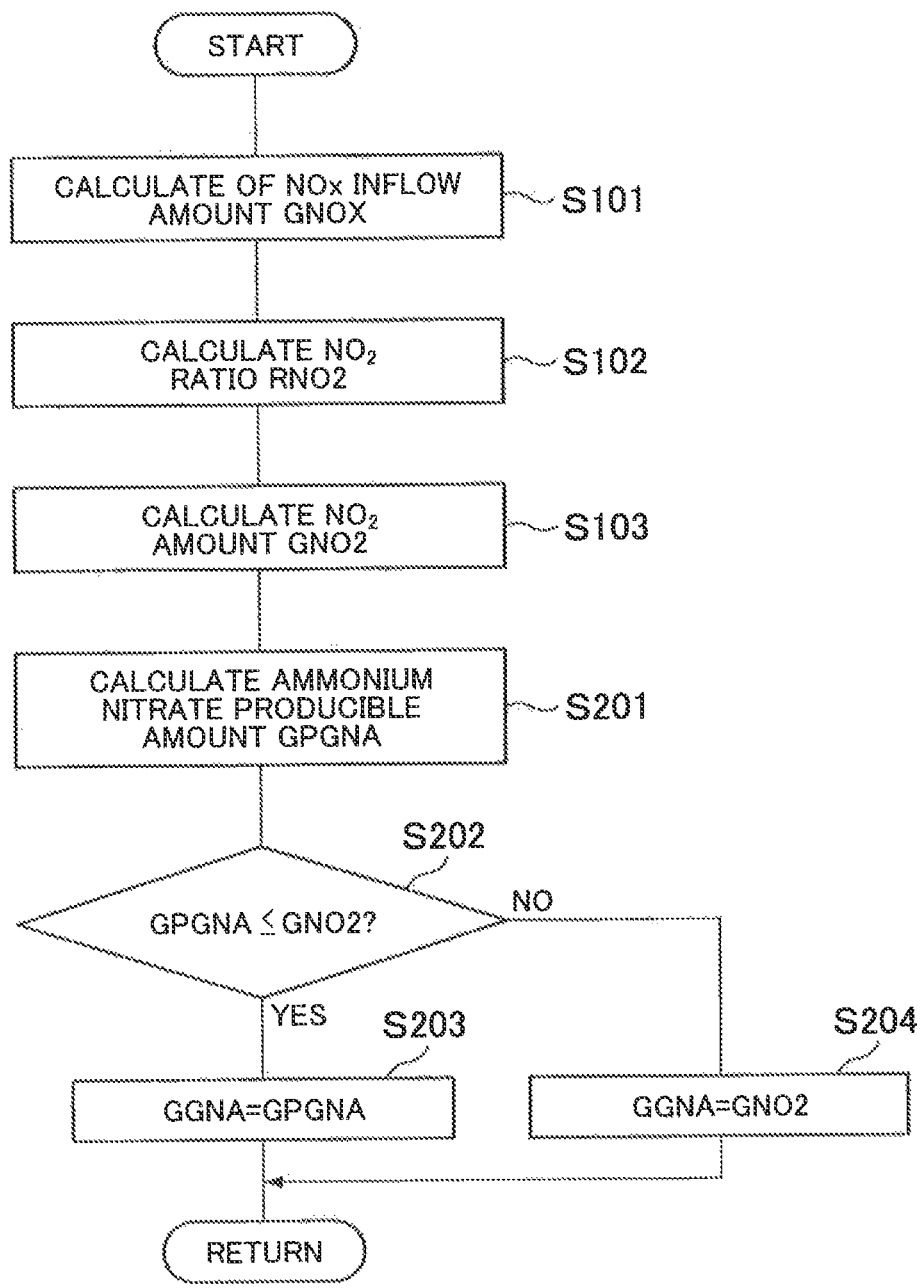
FIG. 9 is a flowchart showing another flow for calculating a production amount of ammonium nitrate.

The ammonium nitrate production amount GGNA may be calculated in the following manner. FIG. 9 is a flowchart showing another flow of calculation of the ammonium nitrate production amount GGNA. This routine is repeatedly executed by the ECU 10 at every predetermined time. The steps in which the same processing as in the above-described flow is performed are represented by the same reference numerals, and description thereof will be omitted.

In this routine, the process progresses to Step S201 after Step S103. In Step S201, the amount (ammonium nitrate producible amount GPGNA) of ammonium nitrate producible on the SCR catalyst 6 is calculated. The ammonium nitrate producible amount GPGNA is the maximum amount of ammonium nitrate producible per unit time on the SCR catalyst 6 found from the temperature of the SCR catalyst 6 at the present time. $NO_2$ which exceeds the ammonium nitrate producible amount GPGNA and flows into the SCR catalyst 6 is not changed to ammonium nitrate and flows out of the SCR catalyst 6. That is, all $NO_2$ flowing into the SCR catalyst 6 are not always changed to ammonium nitrate. Since the ammonium nitrate producible amount GPGNA has a correlation with the temperature of the SCR catalyst 6, the correlation may be found and mapped in advance by an experiment or a simulation, and may be stored in the ECU 10.

Figure 10:
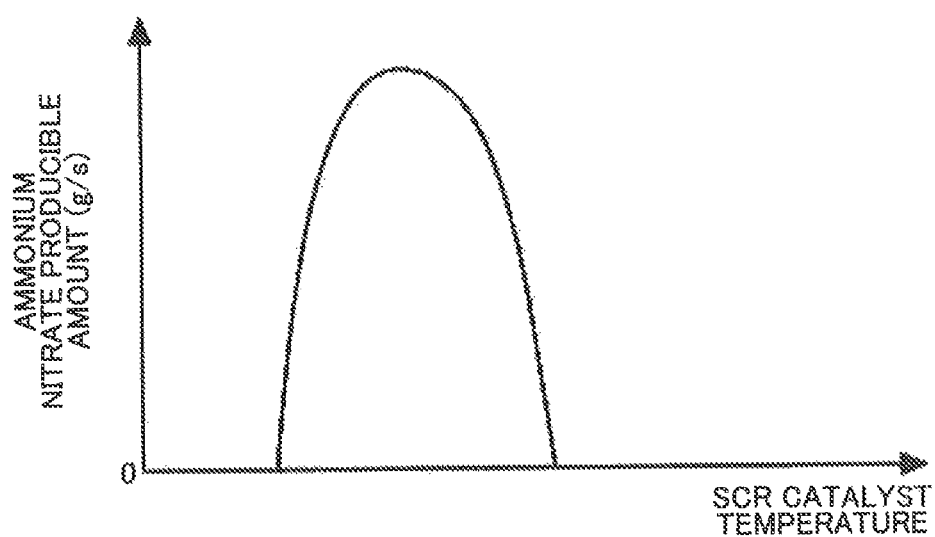
FIG. 10 is a diagram showing the relationship between a temperature of an SCR catalyst 6 and an ammonium nitrate producible amount GPGNA.

FIG. 10 is a diagram showing the relationship between the temperature of the SCR catalyst 6 and the ammonium nitrate producible amount GPGNA. In this way, the ammonium nitrate producible amount GPGNA changes according to the temperature of the SCR catalyst 6. When the flow rate of exhaust gas is high, the ammonium nitrate producible amount GPGNA is decreased. Accordingly, correction may be made according to the flow rate of exhaust gas.

In Step S202, it is determined whether or not the ammonium nitrate producible amount GPGNA calculated in Step S201 is equal to or less than an amount when all the $NO_2$ amount GNO2 flowing into the SCR catalyst 6 calculated in Step S103 are changed to ammonium nitrate. When the determination in Step S202 is affirmative, the process progresses to Step S203, and it is determined that the ammonium nitrate production amount GGNA is equal to the ammonium nitrate producible amount GPGNA. When the determination in Step S202 is negative, the process progresses to Step S204, it is determined that all the $NO_2$ amount GNO2 flowing into the SCR catalyst 6 calculated in Step S103 are changed to ammonium nitrate, and the ammonium nitrate production amount GGNA is calculated.

The ammonia adsorption amount before the ammonium nitrate producing combustion mode is started can be set as a target value of the ammonia adsorption amount during the normal combustion mode. That is, during the normal combustion mode, ammonia is supplied such that the ammonia adsorption amount becomes the target value. In this case, for example, the ammonia adsorption amount is calculated by subtracting the integrated value of the consumption amount of ammonia found from the NOx purification rate from the integrated value of the supply amount of ammonia, and ammonia is supplied such that the ammonia adsorption amount becomes the target value. The supply amount of ammonia can be found based on the valve opening time of the reducing agent injection valve 5. The NOx purification rate can be found from, for example, the NOx concentration upstream of the SCR catalyst 6 and the NOx concentration downstream of the SCR catalyst 6. Then, even when the internal combustion engine 1 is stopped, the ammonia adsorption amount is not changed. Accordingly, when the ammonium nitrate producing combustion mode is started, it can be handled as the state that the ammonia adsorption amount is the target value. The ammonia adsorption amount may be found by a known technique.

FIG. 11 is a diagram showing the relationship between the ammonia adsorption amount ($NH_3$ adsorption amount) and the NOx purification rate on the SCR catalyst 6. When the ammonia adsorption amount is increased, the NOx purification rate is increased.

For example, the ECU 10 supplies the reducing agent from the reducing agent injection valve 5 with an ammonia adsorption amount represented by H in FIG. 11 as a target value. Then, if ammonium nitrate is produced, the ammonia adsorption amount is decreased. As described above, if ammonium nitrate is produced, for example, the ammonia adsorption amount becomes an ammonia adsorption amount represented by E in FIG. 11. In FIG. 11, an ammonia adsorption amount represented by F is an ammonia adsorption amount which becomes the lower limit value of the allowable range of the NOx purification rate. That is, it is desirable that the ammonia adsorption amount is maintained to be equal to or greater than F.

Accordingly, in this example, when the ammonia adsorption amount is decreased to a value of G in FIG. 11, the ammonium nitrate producing combustion mode is ended. The value of G in FIG. 11 is a value greater than the value of F and a value obtained by adding a certain amount of margin to the value of F such that the ammonia adsorption amount is not decreased to the value of F. When the ammonia adsorption amount is decreased to the value of F in FIG. 11, the ammonium nitrate producing combustion mode may be ended.

Figure 12:
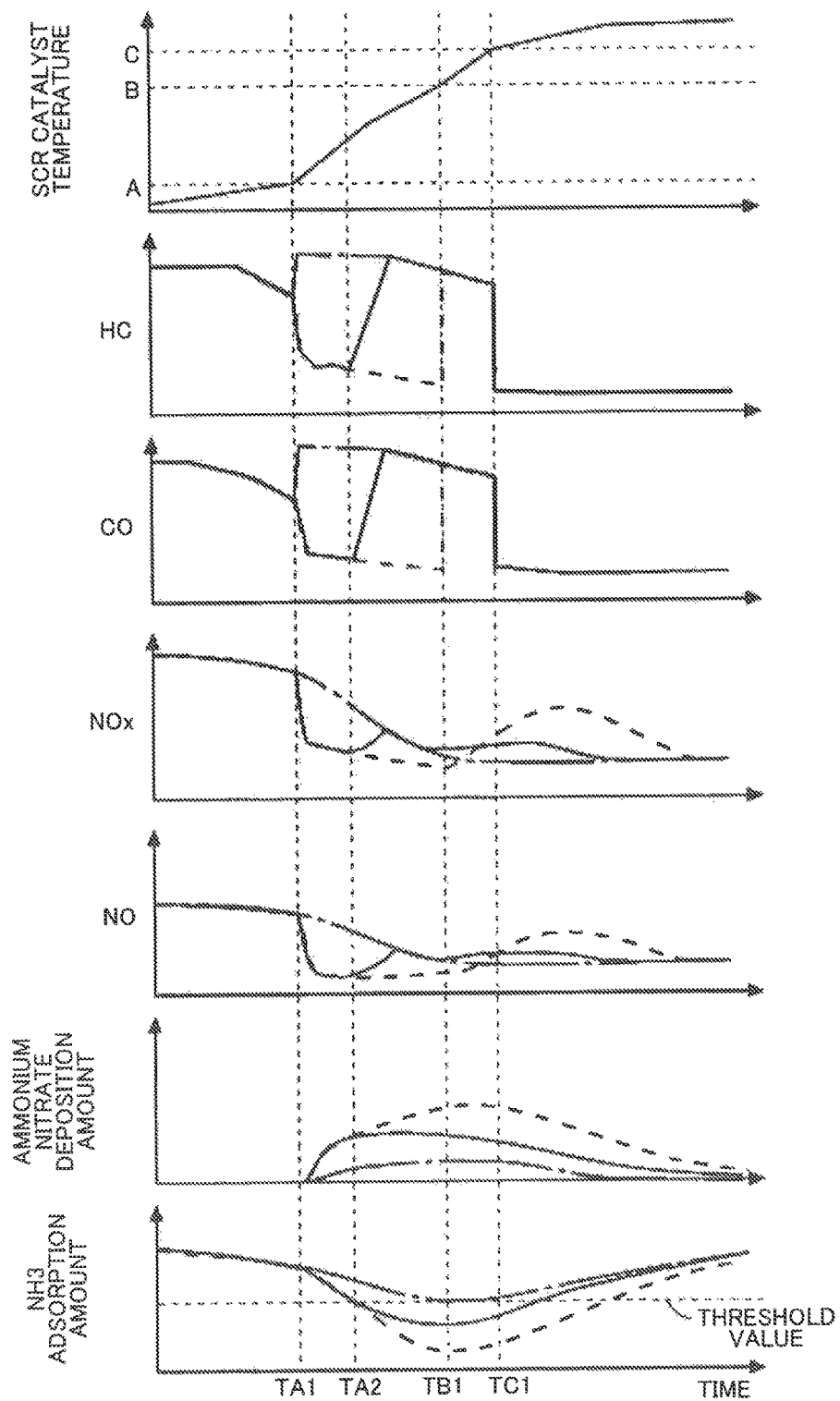
FIG. 12 is a time chart showing transition of a temperature of an SCR catalyst, the amount of HC and the amount of CO emitted from an internal combustion engine 1, an NOx concentration (or NOx amount) downstream of the SCR catalyst, an NO concentration (or NO amount) downstream of the SCR catalyst, an amount (ammonium nitrate deposition amount) of ammonium nitrate adsorbed on the SCR catalyst, and an ammonia adsorption amount.

FIG. 12 is a time chart showing the transition of the temperature of the SCR catalyst 6, the amount of HC and the amount of CO emitted from the internal combustion engine 1, the NOx concentration (or NOx amount) downstream of the SCR catalyst 6, the NO concentration (or NO amount) downstream of the SCR catalyst 6, the amount (ammonium nitrate deposition amount) of ammonium nitrate adsorbed on the SCR catalyst 6, and the ammonia adsorption amount. It is assumed that the ammonium nitrate deposition amount is equal to the ammonium nitrate production amount. At the time TA1, the temperature of the SCR catalyst 6 reaches the temperature of A. At the time TB1, the temperature of the SCR catalyst 6 reaches the temperature of B. At the time TC1, the temperature of the SCR catalyst 6 reaches the temperature of C.

A solid line represents a case where the ammonium nitrate producing combustion mode is ended when the ammonia adsorption amount is less than the threshold value, a broken line represents a case where the ammonium nitrate producing combustion mode is not ended when the ammonia adsorption amount is less than the threshold value (in the case represented by the solid line in FIG. 5), and a one-dot-chain line represents a case where the temperature increasing combustion mode is executed, instead of the ammonium nitrate producing combustion mode (in the case represented by the one-dot-chain line in FIG. 5).

When compared with the time chart shown in FIG. 5, while the transition of the respective values is different, this is because the emission amount of HC and CO or the like is adjusted such that an optimum temperature increasing effect is obtained according to the operation state of the internal combustion engine 1 or the like.

At the time TA2 of FIG. 12, the ammonia adsorption amount is decreased to the threshold value. For this reason, in this example (solid line), the emission amount of HC and CO is increased from the time represented by TA2 until the emission amount of HC and CO is the same as the related art (one-dot-chain line).

When the ammonium nitrate producing combustion mode is not ended when the ammonia adsorption amount is less than the threshold value (broken line), the ammonia adsorption amount is further decreased after the time TA2. Accordingly, the NOx purification rate is decreased after the time TB1, and the emission amount of NOx and NO is increased.

In this example (solid line), while the emission amount of NOx in a period from TA2 to TB1 is increased compared to the case represented by the broken line, the emission amount of NOx after TC1 is smaller than the case represented by the broken line. With this, in this example, the NOx emission amount as a whole can be decreased compared to the case represented by the broken line.

Figure 13:
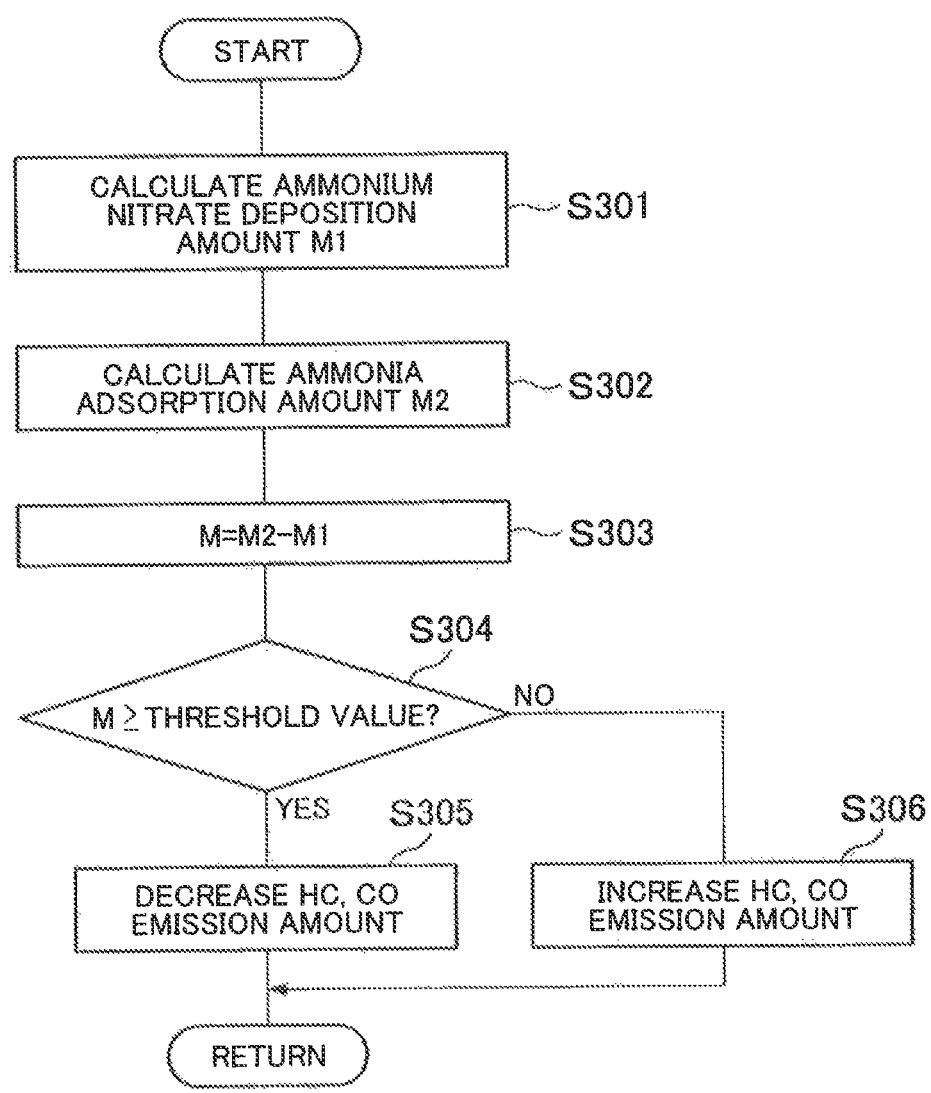
FIG. 13 is a flowchart showing a control flow when an SCR catalyst is at a low temperature according to Example 1.

FIG. 13 is a flowchart showing a control flow when the SCR catalyst 6 is at a low temperature according to this example. This routine is executed by the ECU 10 at every predetermined time during the ammonium nitrate producing combustion mode.

In Step S301, the ammonium nitrate deposition amount M1 is calculated. The ammonium nitrate deposition amount M1 is the amount of ammonium nitrate adsorbed on the SCR catalyst 6, and is calculated as being the same as the production amount of ammonium nitrate. In Step S301, the amount of ammonia consumed to produce ammonium nitrate may be calculated based on the ammonium nitrate production amount.

In Step S302, an ammonia adsorption amount M2 before ammonium nitrate is produced is calculated. The ammonia adsorption amount M2 may be an ammonia adsorption amount at the time of starting of the internal combustion engine 1, or may be an ammonia adsorption amount when the emission amount of HC and CO starts to be decreased. Since urea is not changed to ammonia until the temperature of the SCR catalyst 6 becomes the temperature represented by B after the internal combustion engine 1 is started, it is not possible to supply ammonia to the SCR catalyst 6, if the temperature of the SCR catalyst 6 is lower than A, ammonia does not react on the SCR catalyst 6. Accordingly, the ammonia adsorption amount is not decreased.

In Step S303, an ammonia adsorption amount M at the present time is calculated by subtracting the ammonium nitrate deposition amount M1 calculated in Step S301 from the ammonia adsorption amount M2 calculated in Step S302. In Step S303, the ammonia adsorption amount M at the present time may be calculated by subtracting "the amount of ammonia consumed to produce ammonium nitrate" calculated in Step S301 from the ammonia adsorption amount M2 calculated in Step S302.

In Step S304, it is determined whether or not the ammonia adsorption amount M at the present time is equal to or greater than a threshold value. The threshold value may be an ammonia adsorption amount which becomes the lower limit value of the allowable range of the NOx purification rate, or may be a value obtained by adding a certain amount of margin to the ammonia adsorption amount which becomes the lower limit value. That is, in this step, it may be determined whether or not the NOx purification rate estimated from the amount of ammonia adsorbed on the SCR catalyst 6 at the present time is equal to or greater than a threshold value, instead of determining whether or not the ammonia adsorption amount M at the present time is equal to or greater than the threshold value. The threshold value of the NOx purification rate may be the lower limit value of the allowable range of the NOx purification rate or may be a value having a certain amount of margin.

When the determination in Step S304 is affirmative, the process progresses to Step S305, and when the determination is negative, the process progresses to Step S306.

In Step S305, the emission amount of HC and CO from the internal combustion engine 1 is decreased, and the ammonium nitrate producing combustion mode is executed. In this example, the ECU 10 which processes Step S305 corresponds to a control device in the invention.

In Step. S306, the emission amount of HC and CO from the internal combustion engine 1 is increased, and the temperature increasing combustion mode is executed. That is, the ammonium nitrate producing combustion mode is ended, and transition to the temperature increasing combustion mode suitable for an increase in temperature of the catalyst is made.

In this example, although it is determined in Step S304 whether or not the ammonia adsorption amount M at the present time is equal to or greater than the threshold value, alternatively, it may be determined whether or not the integrated value of the production amount of ammonium nitrate is equal to or less than a predetermined value. That is, when the integrated value of the production amount of ammonium nitrate exceeds the predetermined value, it may be determined that the ammonia adsorption amount is small and the NOx purification rate cannot be maintained within the allowable range.

Figure 14:
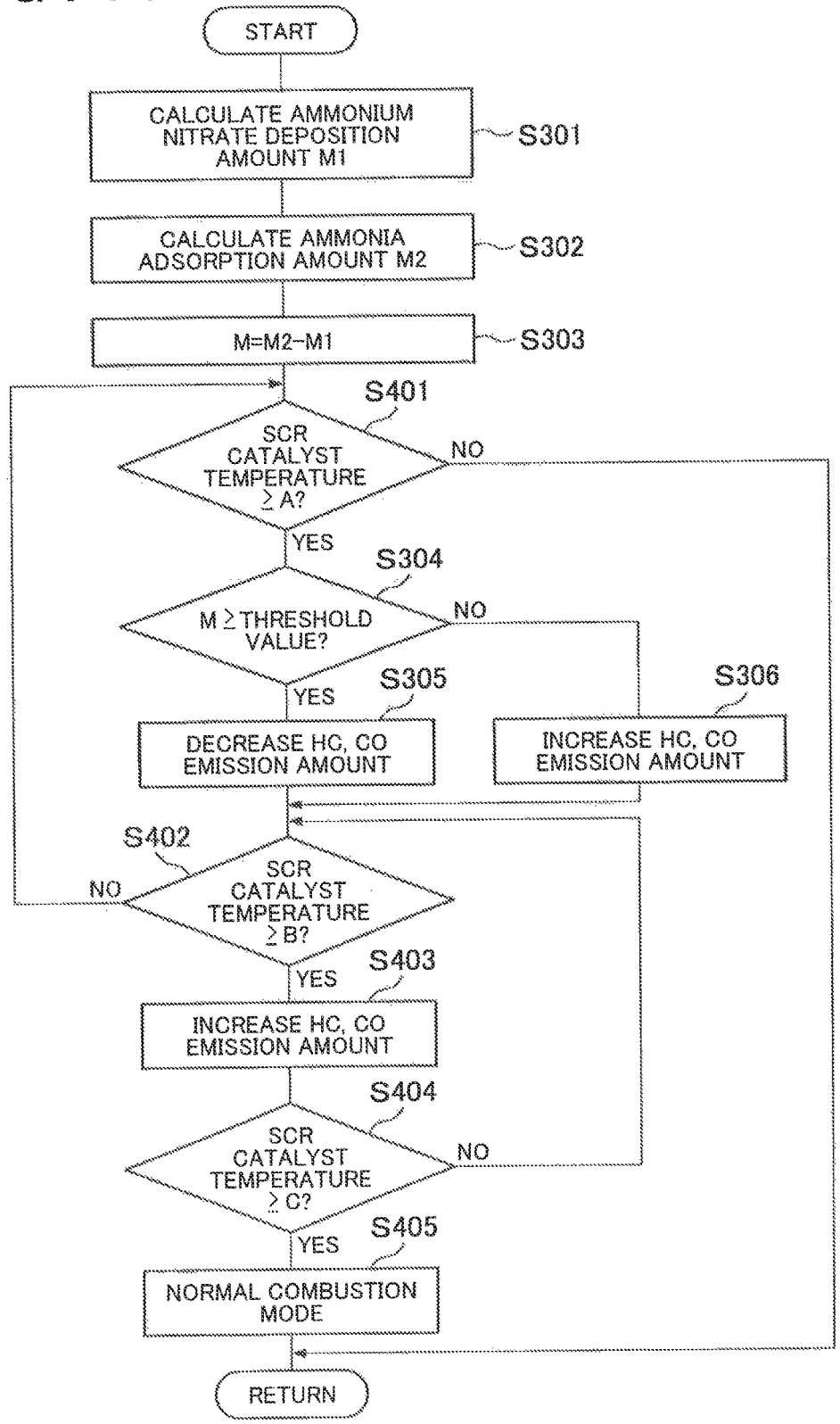
FIG. 14 is a flowchart showing a flow considering a temperature of an SCR catalyst in the control flow when the SCR catalyst is at a low temperature according to Example 1.

To the flow shown in FIG. 13, determination for switching between the combustion modes according to the temperature of the SCR catalyst 6 may be added. FIG. 14 is a flowchart showing a control flow when the SCR catalyst 6 is at a low temperature according to this example and a flow considering the temperature of the SCR catalyst 6. This routine is executed by the ECU 10 at every predetermined time when the SCR catalyst 6 is at a low temperature. The steps in which the same processing as in the above-described flow is performed are represented by the same reference numerals, and description thereof will be omitted.

In this flow, Step S401 is executed after Step S303. In Step S401, it is determined whether or not the temperature of the SCR catalyst 6 is equal to or higher than A. That is, it is determined whether or not the temperature of the SCR catalyst 6 reaches a temperature at which ammonium nitrate is produced.

When the determination in Step S401 is affirmative, the process progresses to Step S304. When the determination in Step S401 is negative, it is not possible to produce ammonium nitrate on the SCR catalyst 6 and to purify NOx. Accordingly, this routine is ended. In this case, the temperature increasing combustion mode may be executed.

In this routine, Step S402 is executed after Step S305 or Step S306. In Step S402, it is determined whether or not the temperature of the SCR catalyst 6 is equal to or higher than B. That is, it is determined whether or not the temperature of the SCR catalyst 6 reaches a temperature at which ammonium nitrate is produced on the SCR catalyst 6 and NO and $NO_2$ are reduced.

When the determination in Step S402 is affirmative, the process progresses to Step S403. When the determination in Step S402 is negative, the process' progresses to Step S401.

In Step S403, the emission amount of HC and CO is increased, and the temperature increasing combustion mode is executed. That is, the amount of HC and CO emitted from the internal combustion engine 1 is comparatively large, HC and CO are oxidized on the oxidation catalyst 3 or the like, and the temperature of the SCR catalyst 6 is increased by heat generated at this time. At this time, since NO and $NO_2$ are reduced on the SCR catalyst 6, it is not necessary to increase the ratio of $NO_2$ in NOx.

In Step S404, it is determined whether or not the temperature of the SCR catalyst 6 is equal to or higher than C. That is, it is determined whether or not the temperature of the SCR catalyst 6 reaches a temperature at which the SCR catalyst 6 is completely oxidized and the original purification capability can be exhibited. When the determination in Step S404 is affirmative, the process progresses to Step S405, and when the determination is negative, the process progresses to Step S402.

In Step S405, the temperature increasing combustion mode of the SCR catalyst 6 is ended, and transition to the normal combustion mode is made. In the normal combustion mode, a main injection amount, a main injection or after injection timing, an after injection amount, and the like are adjusted based on the operation state (for example, engine speed and engine load) of the internal combustion engine 1. The relationship is found and mapped in advance by an experiment or the like such that fuel consumption or engine output becomes an optimum state. Thereafter, this routine is ended.

In this example, although the oxidation catalyst 3 is provided, since HC and CO are oxidized on the SCR catalyst 6, even when the oxidation catalyst 3 is not provided, the amount of unburned fuel flowing into the SCR catalyst 6 is decreased, whereby it is possible to promote the oxidation of NO.

In this example, although the emission of HC and CO from the internal combustion engine 1 is suppressed by advancing the fuel injection timing or decreasing the after injection amount, HC and CO may be decreased by other methods. A plurality of methods may be used in combination.

For example, when the EGR device 30 is provided, the EGR gas amount may be decreased during the temperature increasing combustion mode compared to during the ammonium nitrate producing combustion mode. That is, the opening of the EGR valve 32 may be decreased during the ammonium nitrate producing combustion mode. The supply of EGR gas may be stopped during the ammonium nitrate producing combustion mode. When this happens, the combustion state becomes more stable. Accordingly, it is possible to decrease the emission amount of unburned fuel from the internal combustion engine 1. With this, it is possible to promote the oxidation of NO.

The amount of HC and CO flowing into the oxidation catalyst 3 and the SCR catalyst 6 may be decreased without changing the amount of HC and CO emitted from the internal combustion engine 1. For example, when a fuel addition valve which adds fuel into the exhaust passage 2 upstream of the oxidation catalyst 3 is provided, a fuel addition amount from the fuel addition valve may be decreased during the ammonium nitrate producing combustion mode compared to during the temperature increasing combustion mode. The fuel addition from the fuel addition valve may be stopped during the ammonium nitrate producing combustion mode. With this, it is possible to suppress the reaction of fuel with oxygen on the oxidation catalyst 3 and the SCR catalyst 6. Accordingly, it is possible to promote the oxidation of NO.

As described above, according to this example, while NO cannot be purified on the SCR catalyst 6, when the temperature at which $NO_2$ reacts with ammonia and ammonium nitrate is produced is reached, the amount of HC and CO in exhaust gas is decreased, whereby it is possible to decrease the amount of NO in exhaust gas and to increase the amount of $NO_2$. Then, $NO_2$ reacts with ammonia on the SCR catalyst 6 to produce ammonium nitrate, whereby it is possible to suppress the outflow of NOx from the SCR catalyst 6. That is, it is possible to decrease the amount of NOx emitted into the air.

According to this example, the production of ammonium nitrate is limited such that the NOx purification rate after the activation of the SCR catalyst 6 falls within the allowable range, it is possible to decrease the emission amount of NOx into the air as a whole.

Example 2

In Example 1, the amount of HC and CO flowing into the oxidation catalyst 3 and the SCR catalyst 6 is decreased, thereby promoting the oxidation of NO. In this example, an oxygen concentration in exhaust gas is increased, thereby promoting the oxidation of NO. This example can be executed simultaneously with the above-described example.

Figure 15:
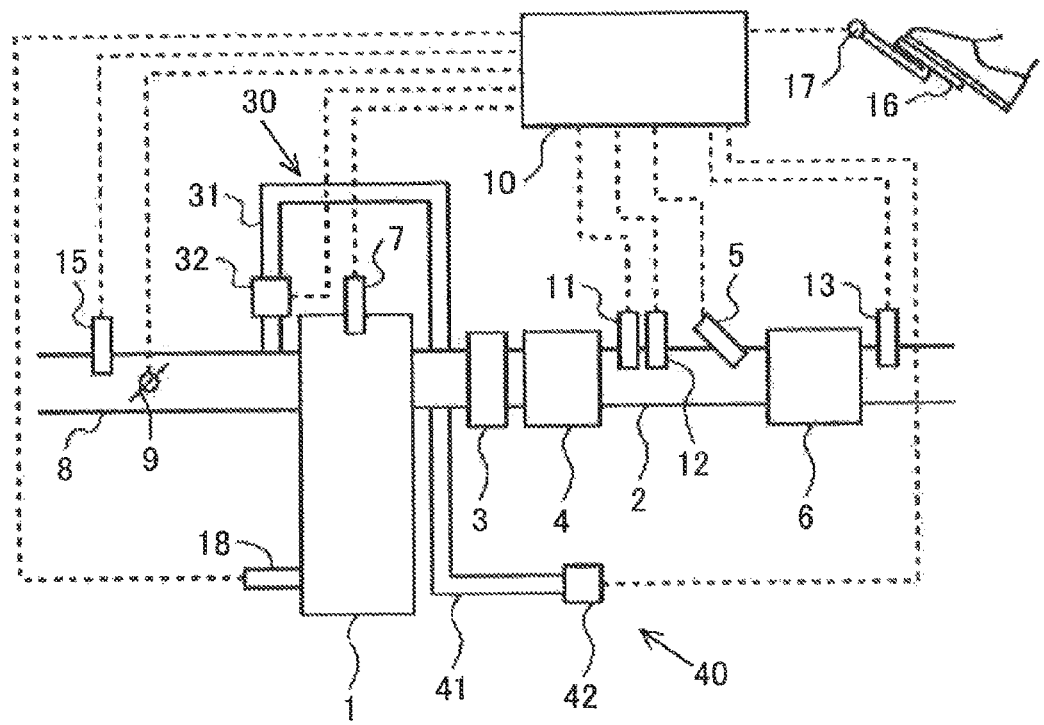
FIG. 15 is a diagram showing the schematic configuration of an internal combustion engine according to Example 2.

FIG. 15 is a diagram showing the schematic configuration of an internal combustion engine according to this example. The same devices as those shown in FIG. 1 are represented by the same reference numerals, and description thereof will be omitted.

In this example, a secondary air supply device 40 which supplies secondary air to the exhaust passage 2 upstream of the oxidation catalyst 3 is provided. The secondary air supply device 40 is provided with a secondary air supply passage 41 which is connected to the exhaust passage 2, and a pump 42 which is connected to the secondary air supply passage 41 and ejects air. The pump 42 is controlled by the ECU 10.

The oxygen concentration in exhaust gas is increased, whereby it is possible to promote the oxidation of NO flowing into the oxidation catalyst 3 and the SCR catalyst 6. With this, the ammonium nitrate production amount on the SCR catalyst 6 is increased. Accordingly, it is possible to suppress the emission of NOx into the air. When the NOx purification rate estimated from the amount of ammonia adsorbed on the SCR catalyst 6 is less than the threshold value, the amount of $NO_2$ is decreased to suppress the production of ammonium nitrate. That is, the amount of oxygen flowing into a catalyst having an oxidation function is decreased, whereby the oxidation of NO is suppressed. Accordingly, it is possible to decrease the amount of $NO_2$. With this, it is possible to suppress a decrease in the NOx purification rate.

For example, when the EGR device 30 is provided, the oxygen concentration in exhaust gas can be increased by decreasing the EGR gas amount, and the oxygen concentration in exhaust gas can be decreased by increasing the EGR gas amount. When decreasing the EGR gas amount, the supply of EGR gas may be stopped. Furthermore, the opening of the throttle 9 may be increased. That is, the amount of oxygen emitted from the internal combustion engine 1 is increased or oxygen is supplied into exhaust gas, whereby it is possible to increase the oxygen concentration in exhaust gas. In this example, the EGR device 30 or the secondary air supply device 40 corresponds to an oxygen supply device in the invention.

The optimum values of the EGR gas amount or the secondary air amount, and the opening of the throttle 9 may be found by an experiment, a simulation, or the like. The EGR gas amount or the secondary air amount, and the opening of the throttle 9 may be adjusted according to the temperature of the oxidation catalyst 3 or the temperature of the SCR catalyst 6.

A heater which increases the temperature of the oxidation catalyst 3 or the SCR catalyst 6 may be provided. If the temperature of the oxidation catalyst 3 or the SCR catalyst 6 can be increased by the heater, it is possible to increase the temperature of NO to a temperature enabling oxidation quickly. With this, it is possible to produce ammonium nitrate beforehand. The heater is controlled by the ECU 10.

Figure 16:
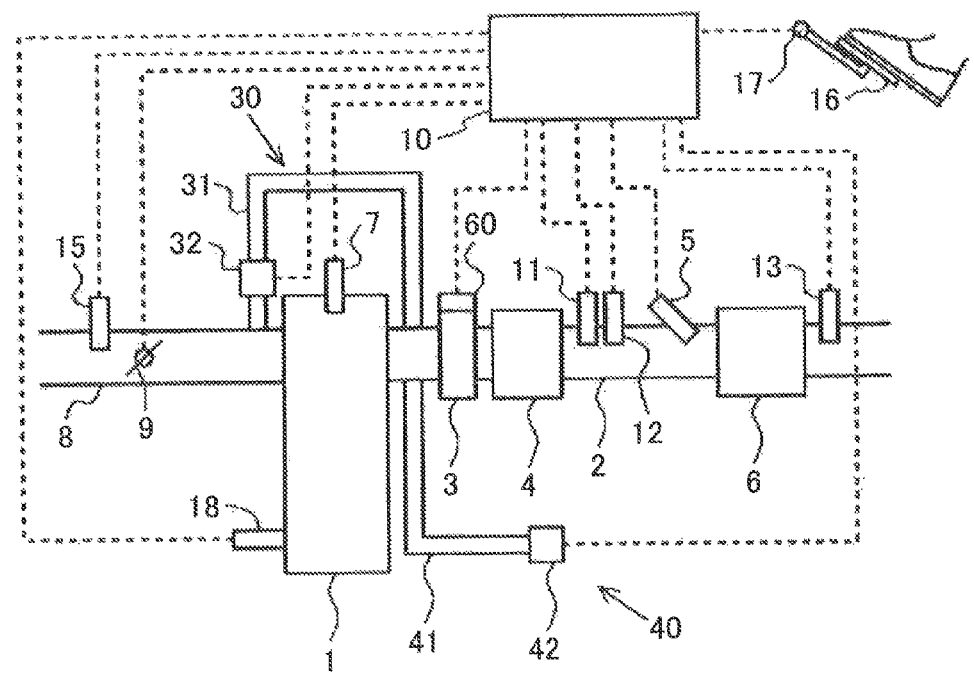
FIG. 16 is another diagram showing the schematic configuration of the internal combustion engine according to Example 2.

FIG. 16 is another diagram showing the schematic configuration of the internal combustion engine according to this example. As a heating device, an electric heater 60 which heats the oxidation catalyst 3 is provided. The electric heater 60 is controlled by the ECU 10. The electric heater 60 may be a heater which applies current to the carrier of the oxidation catalyst 3 to generate heat by the electric resistance of the carrier. The electric heater 60 may be provided in the SCR catalyst 6.

In this way, the temperature of the oxidation catalyst 3 or the SCR catalyst 6 can be increased by the electric heater 60. A combustion type heater may be used instead of the electric heater 60. When a passage which bypasses a turbocharger and a turbine of the turbocharger is provided, exhaust gas is made to flow through the passage which bypasses the turbine, whereby it is possible to suppress a decrease in temperature of exhaust gas in the turbine. That is, the temperature of the oxidation catalyst 3 or the SCR catalyst 6 may be increased, or a decrease in temperature of exhaust gas may be suppressed.

The oxidation catalyst 3 or the SCR catalyst 6 may be heated until the oxidation catalyst 3 or the SCR catalyst 6 reaches the temperature of either of A, B, and C. In this example, a bypass passage which bypasses an electric heater, a combustion type heater, and a turbine corresponds to a heat supply device in the invention.

The reaction time on the catalyst may be secured by decreasing the flow rate of exhaust gas passing through the oxidation catalyst 3 and the SCR catalyst 6. For example, the intake air amount may be decreased or the supercharging pressure may be decreased. The EGR gas amount may be increased.

REFERENCE SIGNS LIST

1: internal combustion engine
2: exhaust passage
3: oxidation catalyst
4: filter
5: reducing agent injection valve
6: selective reduction type NOx catalyst (SCR catalyst)
7: fuel injection valve
8: intake passage
9: throttle
10: ECU
11: temperature sensor
12: upstream-side NOx sensor
13: downstream-side NOx sensor
15: air flow meter
16: accelerator pedal
17: accelerator opening sensor
18: crank position sensor
30: EGR device
31: EGR passage
32: EGR valve

The invention claimed is:

1. An exhaust gas control apparatus for an internal combustion engine, the exhaust gas control apparatus comprising:
   a selective reduction type NOx catalyst provided in an exhaust passage of the internal combustion engine and configured to reduce NOx with ammonia as a reducing agent;
   a supply device configured to supply ammonia to the selective reduction type NOx catalyst;
   a temperature sensor configured to measure or estimate the temperature of the selective reduction type NOx catalyst;
   an electronic control unit configured to:
   (i) measure or estimate an amount of ammonium nitrate produced on the selective reduction type NOx catalyst; and
   (ii) calculate an amount of ammonia adsorbed on the selective reduction type NOx catalyst at the present time by subtracting the amount of ammonium nitrate produced on the selective reduction type NOx catalyst from the amount of ammonia adsorbed on the selective reduction type NOx catalyst at the time of starting of the internal combustion engine, and
   (iii) decrease an amount of $NO_2$ flowing into the selective reduction type NOx catalyst when an NOx purification rate estimated from the amount of ammonia adsorbed on the selective reduction type NOx catalyst at the present time is less than a threshold value, as compared to when the NOx purification rate is equal to or greater than the threshold value.

2. The exhaust gas control apparatus according to claim 1, wherein the electronic control unit is configured to increase the amount of $NO_2$ flowing into the selective reduction type NOx catalyst by increasing a ratio of $NO_2$ in NOx flowing into the selective reduction type NOx catalyst, and
   the electronic control unit is configured to decrease the amount of $NO_2$ flowing into the selective reduction type NOx catalyst by decreasing the ratio of $NO_2$ in NOx flowing into the selective reduction type NOx catalyst.

3. The exhaust gas control apparatus according to claim 1, wherein, when the temperature of the selective reduction type NOx catalyst is equal to or higher than a predetermined temperature at which ammonia reacts with $NO_2$, the electronic control unit is configured to decrease the amount of $NO_2$ flowing into the selective reduction type NOx catalyst.

4. The exhaust gas control apparatus according to claim 3, further comprising:
   a catalyst having an oxidation function and provided upstream of the selective reduction type NOx catalyst; and
   a heat supply device configured to supply heat to the catalyst having the oxidation function,
   wherein the electronic control unit is configured to cause the heat supply device to supply heat to the catalyst having the oxidation function until the temperature of the selective reduction type NOx catalyst becomes equal to or higher than the predetermined temperature.

5. The exhaust gas control apparatus according to claim 1, wherein, when the temperature of the selective reduction type NOx catalyst is lower than a temperature enabling reduction of NO, the electronic control unit is configured to decrease the amount of $NO_2$ flowing into the selective reduction type NOx catalyst.

6. The exhaust gas control apparatus according to claim 1, further comprising:
   a catalyst having an oxidation function and provided upstream of the selective reduction type NOx catalyst,
   wherein the electronic control unit is configured to decrease the amount of $NO_2$ flowing into the selective reduction type NOx catalyst by increasing an amount of unburned fuel flowing into the catalyst having the oxidation function.

7. The exhaust gas control apparatus according to claim 1, further comprising:
   a catalyst having an oxidation function and provided upstream of the selective reduction type NOx catalyst; and
   an oxygen supply device configured to supply oxygen into exhaust gas upstream of the catalyst having the oxidation function,
   wherein the electronic control unit is configured to decrease the amount of $NO_2$ flowing into the selective reduction type NOx catalyst by decreasing an amount of oxygen supplied into exhaust gas upstream of the catalyst having the oxidation function with the oxygen supply device.

\* \* \* \* \*